United States Patent [19]
Mori et al.

[11] Patent Number: 5,592,347
[45] Date of Patent: Jan. 7, 1997

[54] APPARATUS FOR MEASURING OFFSET OF HEAD FROM SERVO PATTERN OF DATA SURFACE AND DISK MEDIUM HAVING RECORDED SERVO PATTERN FOR MEASUREMENT OF OFFSET

[75] Inventors: Kazunori Mori; Tatsuro Sasamoto, both of Kawasaki, Japan

[73] Assignee: Fujitsu Limited, Japan

[21] Appl. No.: 347,516

[22] Filed: Nov. 30, 1994

[30] Foreign Application Priority Data

Mar. 15, 1994 [JP] Japan .................................. 6-043406

[51] Int. Cl.$^6$ .............................. G11B 5/596; G11B 5/09
[52] U.S. Cl. ...................... 360/77.04; 360/77.05; 360/48
[58] Field of Search ........................... 360/77.04, 72.08, 360/75, 77.05

[56] References Cited

U.S. PATENT DOCUMENTS

| 4,737,869 | 4/1988 | Sugaya et al. | 360/77.08 |
| 4,977,470 | 12/1990 | Murayama et al. | 360/77.08 X |
| 5,168,398 | 12/1992 | Kanda et al. | 360/77.04 X |
| 5,426,544 | 6/1995 | Narita et al. | 360/77.04 |

FOREIGN PATENT DOCUMENTS

| 56-134367 | 10/1981 | Japan . |
| 62-266781 | 11/1987 | Japan . |
| 63-058683 | 3/1988 | Japan . |
| 1-091382 | 4/1989 | Japan . |
| 1-124165 | 5/1989 | Japan . |
| 1-317286 | 12/1989 | Japan . |
| 2-246064 | 10/1990 | Japan . |
| 4-129071 | 4/1992 | Japan . |
| 5-242617 | 9/1993 | Japan . |

Primary Examiner—Won Tae C. Kim
Assistant Examiner—Regina Y. Neal
Attorney, Agent, or Firm—Greer, Burns & Crain, Ltd.

[57] ABSTRACT

In a disk medium, as servo patterns for offset detection, a pattern which is offset to the inner side, a pattern which is offset to the outer side, and a polarity pattern of a size exceeding a width of pattern as necessary are recorded in the track direction at specific cylinder positions of each data surface. In the case where only one of the read signals of the patterns which are offset to the inner side and outer side is obtained, the head is returned in such a direction as to eliminate the offset, and an offset measuring section measures the offset again. In this case, the offset measurement value is set to the total value of the head return amount and the last offset amount obtained from the read signals V1 and V2. When both of the two pattern read signals V1 and V2 are not obtained, the presence or absence of the read signal of the polarity pattern is judged. When the read signal of the polarity pattern exists, the head is offset to the side opposite to the polarity pattern by a predetermined amount and the offset is again measured. When the read signal of the polarity pattern doesn't exist, the head is offset by only the predetermined amount to the side on which the polarity pattern is not recorded and the offset is subsequently measured again.

17 Claims, 18 Drawing Sheets

AMPLITUDE LEVEL AT HEAD POSITION OF P1

AMPLITUDE LEVEL AT HEAD POSITION OF P2

AMPLITUDE LEVEL AT HEAD POSITION OF P3

AMPLITUDE LEVEL AT HEAD POSITION OF P4

AMPLITUDE LEVEL AT HEAD POSITION OF P5

AMPLITUDE LEVEL AT HEAD POSITION OF P6

AMPLITUDE LEVEL AT HEAD POSITION OF P7

Fig. 3A (PRIOR ART)
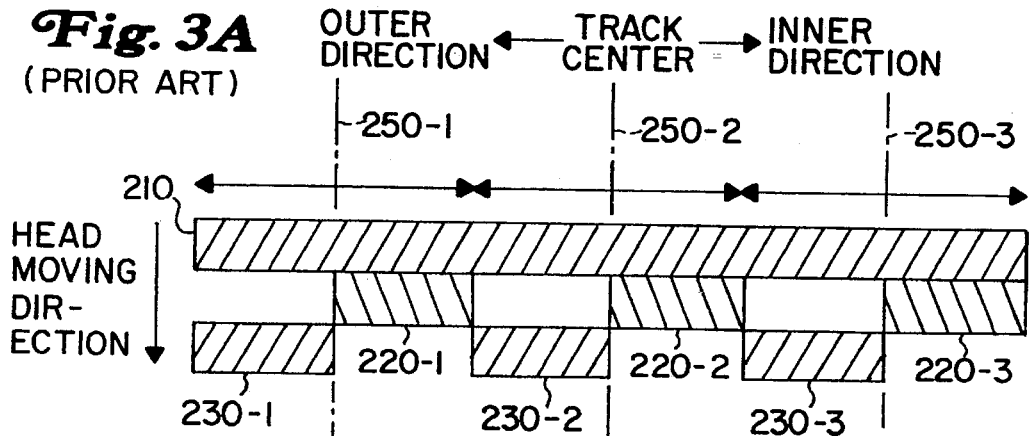
Fig. 3B (PRIOR ART) V_AGC
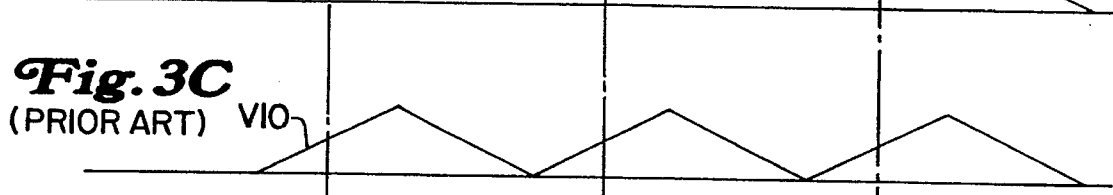
Fig. 3C (PRIOR ART) VIO
Fig. 3D (PRIOR ART) VII
Fig. 3E (PRIOR ART)
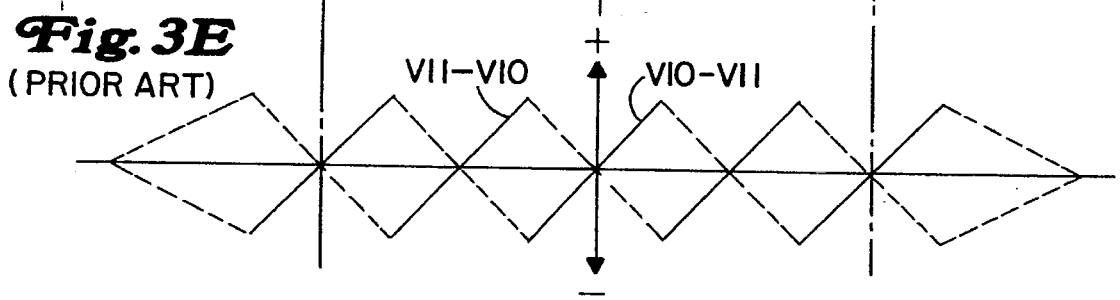

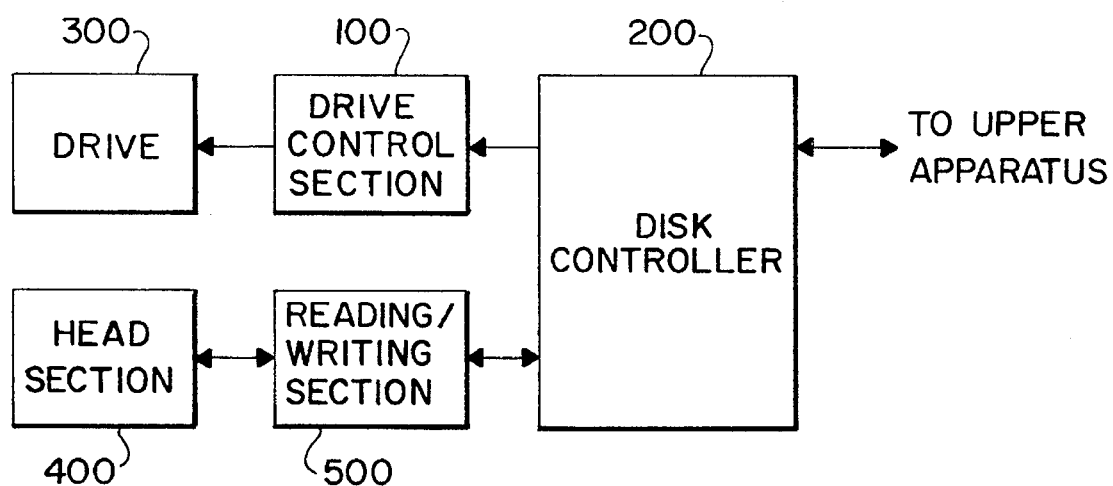

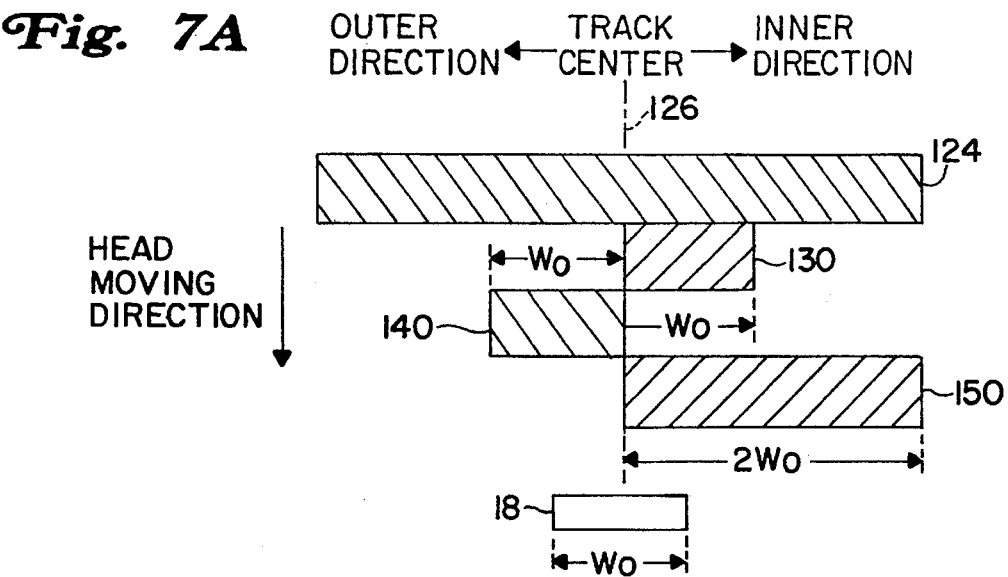
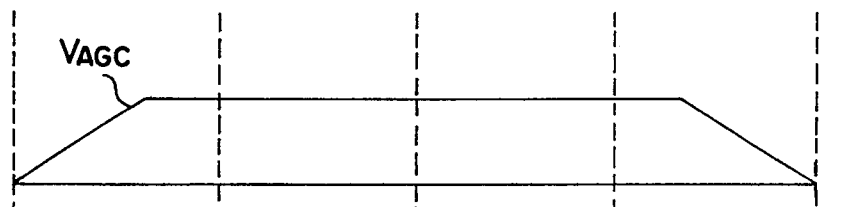

INNER SIDE
TRACK CENTER
OUTER SIDE
HEAD MOVING DIRECTION

AMPLITUDE LEVEL AT HEAD POSITION OF P1

AMPLITUDE LEVEL AT HEAD POSITION OF P2

AMPLITUDE LEVEL AT HEAD POSITION OF P3

AMPLITUDE LEVEL AT HEAD POSITION OF P4

AMPLITUDE LEVEL AT HEAD POSITION OF P5

AMPLITUDE LEVEL AT HEAD POSITION OF P6

AMPLITUDE LEVEL AT HEAD POSITION OF P7

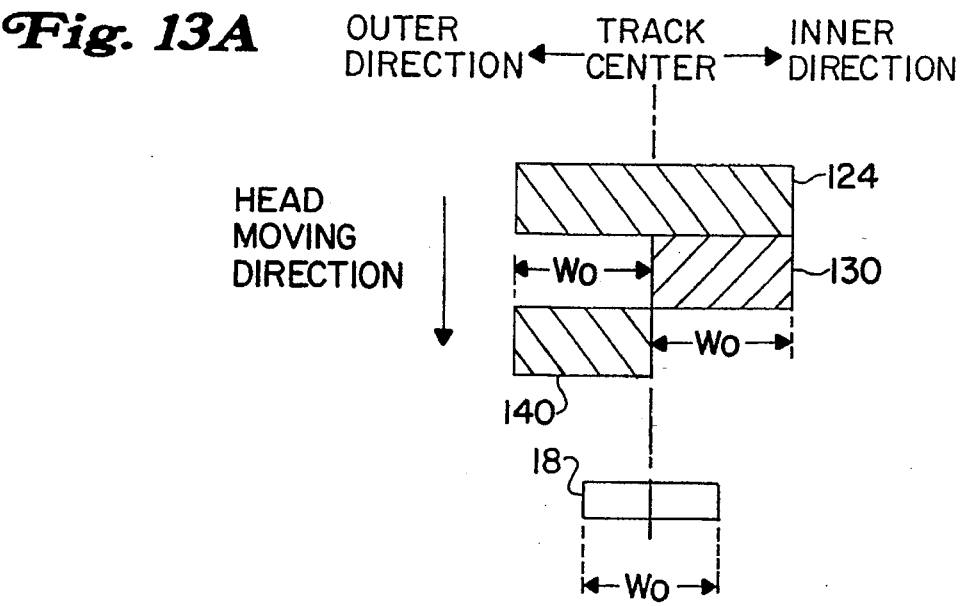
Fig. 13A
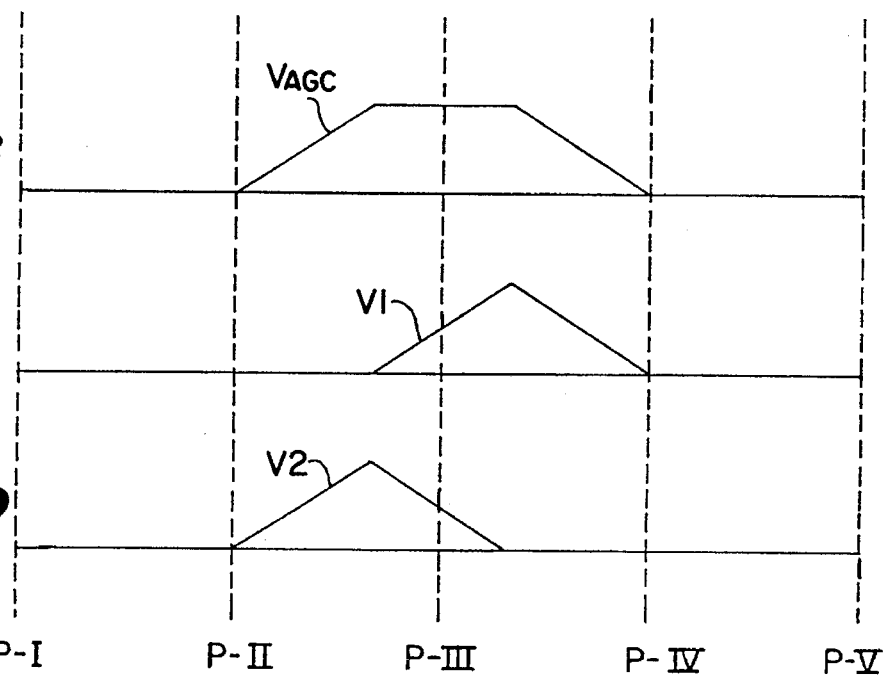
Fig. 13B
Fig. 13C
Fig. 13D

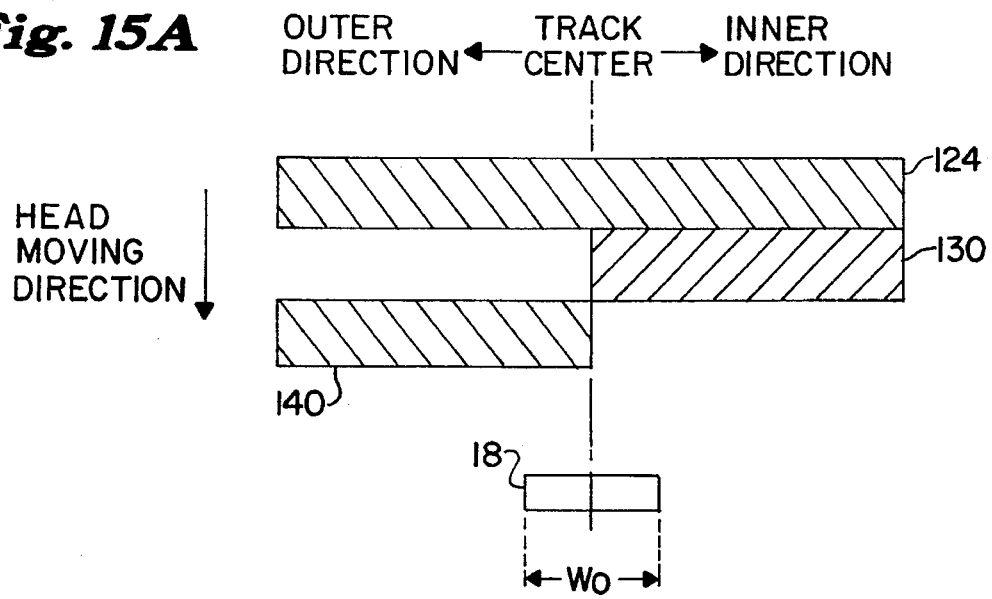
*Fig. 15A*
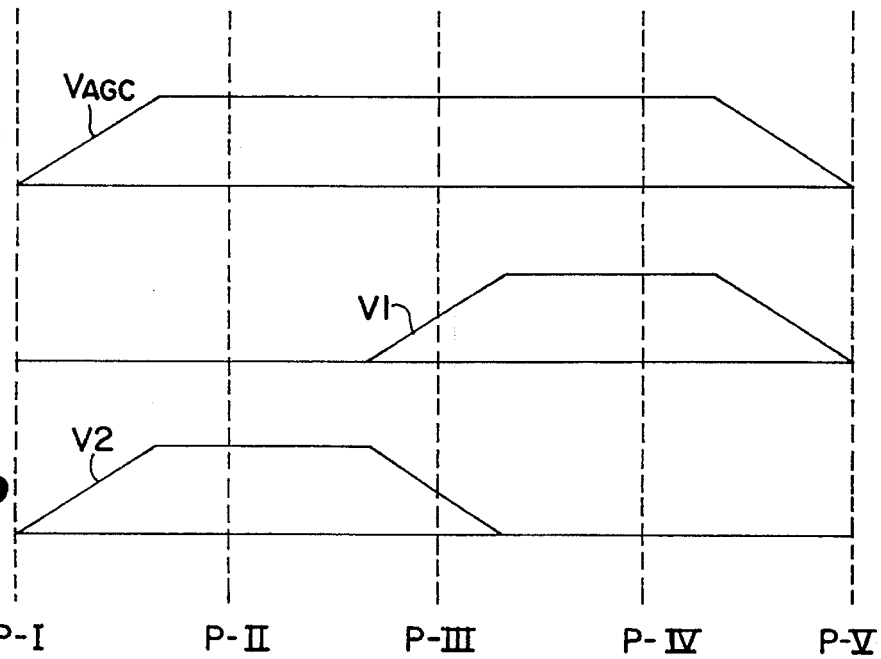
*Fig. 15B*
*Fig. 15C*
*Fig. 15D*

APPARATUS FOR MEASURING OFFSET OF HEAD FROM SERVO PATTERN OF DATA SURFACE AND DISK MEDIUM HAVING RECORDED SERVO PATTERN FOR MEASUREMENT OF OFFSET

BACKGROUND OF THE INVENTION

The invention relates to a disk apparatus for positioning a head on the basis of a servo pattern recorded on a servo surface and, more particularly, to a disk apparatus in which an offset amount is measured on the basis of a servo pattern for offset recorded on a specific cylinder on a data surface and the position of the head is corrected in such a direction as to eliminate the offset in the reading or writing operation, thereby on-tracking the head.

Hitherto, according to the positioning control of a head of a magnetic disk unit, a servo signal recorded on a servo surface of a disk medium is read and the head is positioned to a track center. Further, even when the servo surface and the data surface are located at the same cylinder position, there is an offset due to a mechanical error, decentering, or the like. Therefore, a servo pattern for detecting the offset is previously recorded at a specific cylinder position on the data surface. When a power source is turned on, the offset is measured for every data surface and stored into an RAM. In the actual reading or writing operation, the offset measurement value is read out from the RAM and the position of the head is corrected, thereby accurately on-tracking the head.

FIG. 1A shows servo patterns for offset detection which are recorded on a specific cylinder of a data surface at regular intervals in a conventional apparatus. It is now assumed that an AGC pattern 210, an inner offset pattern 220, and an outer offset pattern 230 are sequentially recorded along a track center 250 of the specific cylinder on the data surface in a relative moving direction (downward) of a data head 240. Those servo patterns are magnetic recording patterns which are recorded by frequency signals having frequencies higher than a recording frequency. The AGC pattern 210 is the recording pattern which is symmetrical for the track center 250. The inner offset pattern 220 is the pattern recorded to have almost the same width as that of the data head 240 from the track center 250 toward the inner side. The outer offset pattern 230 is the pattern recorded so as to have almost the same width as the data head 240 from the track center 250 toward the outer side.

A measuring process of an off-track is executed as follows. First, a reference value of an amplitude level of an AGC amplifier which is used to amplify a read signal of the data head 240 is determined from an AGC signal $V_{AGC}$ obtained by reading the AGC pattern 210. As shown in FIG. 1B, the AGC signal $V_{AGC}$ is a signal which is constant on both sides of a track center P-II and is attenuated to 0 at a position P-I on the outer side or a position P-III on the inner side.

Subsequently, the inner offset pattern 220 recorded on the inner side from the track center 250 and the outer offset pattern 230 recorded on the outer side are respectively read, thereby obtaining offset read signals V10 and V11. An offset amount is obtained on the basis of a difference signal (V10–V11) between the two offset read signals V10 and V11. That is, the offset read signal V10 changes as shown in FIG. 1C and the read signal V11 changes as shown in FIG. 1D in accordance with the offset position of the data head 240. Therefore, the difference signal (V10–V11) between both of those signals is a signal which is proportional to the offset amount and which is set to 0 at the track center 250 and linearly changes in the plus direction on the inner side and in the minus direction on the outer side as shown in FIG. 1E. The offset can be obtained from the difference signal.

The AGC pattern 210 and offset patterns 220 and 230 in FIG. 1A are recorded at regular intervals on a track of a specific cylinder of the data surface. Therefore, as a measurement result of one circumference of the track, an AGC amplitude level and an offset amount are stored into an RAM table or the like. In the head positioning control in the reading or writing mode, the AGC amplitude level and the offset amount are read out from the RAM table synchronously with the disk rotation, thereby setting the level of the AGC amplifier and performing the offset correction of a head positioning signal. FIGS. 2B to 2H show changes in amplitude levels of the read signals $V_{AGC}$, V10, and V11 in the case where the head is offset to positions P1 to P7 in FIG. 2A.

In the recent magnetic disk unit, a distance between the tracks, namely, a track pitch is further narrowed in association with the improvement of a recording density of the disk medium. Recording widths of the servo patterns for AGC and off-track detection of the servo surface are also narrowed in association with the narrow track pitch. Even if the offset amount of the head is the same, since the track pitch is narrowed, it is necessary to detect the offset in a wide range. In the conventional servo patterns for off-track detection, however, although a range of the offset positions P2 to P6 in FIG. 2A can be detected, the offset positions P1 and P7 exceeding such a range cannot be detected. That is, as shown in FIGS. 2B and 2H, when both of the pattern read signals V10 and V11 are not obtained, a problem exists as to which of the inner side and the outer side the data head is offset isn't known.

A 2-phase servo system is used to solve the above problem. As shown in FIG. 3A, according to the 2-phase servo system, servo patterns of three tracks having track centers 250-1 to 250-3 are recorded at specific cylinder positions of the data surface for the purpose of offset detection. In this case, an offset amount for the track center 250-2 of the track locating at the center is measured. As shown in FIGS. 3C and 3D, a phase difference corresponding to a width amount of the data head 240 exists between the read signal V10 of servo patterns 220-1 to 220-3 which are offset on the inner side for each track center and the read signal V11 of servo patterns 230-1 to 230-3 which are offset on the outer side. In this case, difference signals (V10–V11) and (V11–V10) of two phases of FIG. 3E can be obtained as difference signals between the read signals V10 and V11. By handling portions shown by solid lines of the difference signals of two phases as effective signals, the offset in a wide range can be accurately detected. In case of the 2-phase servo system, however, as shown in FIG. 3A, an area of three cylinders is necessary when the servo patterns for offset detection are recorded to the data surface. There a problem exists such that the data area is limited and a recording capacity of the disk decreases.

SUMMARY OF THE INVENTION

According to the invention, a disk apparatus which can detect an offset amount in a wide range for a track pitch without decreasing recording capacity of a disk is provided. According to the disk medium of the invention, one of a plurality of disk surfaces is set to a servo surface on which servo patterns have been recorded every cylinder and the remaining disk surfaces are set to data surfaces. Further, the first servo pattern is recorded at a specific cylinder position of each data surface so as to be offset on the inner side as a servo pattern for offset detection. Subsequently, the second servo pattern is recorded in parallel in the track direction so as to be offset on the outer side.

For such a disk medium, a servo head for reading the servo patterns and a plurality of data heads for reading and writing information from/to the data surfaces can be moved by a head actuator in a direction in which they integrally traverse the tracks.

When the offset is measured, a measurement positioning section positions the servo head and each data head to the specific cylinder position for offset detection on each data surface. An offset measuring section judges whether the offset of the data head lies within a specified value or not from the read signal by the data head of the servo patterns recorded on the specific cylinder for offset detection. When it is judged that the offset of the data head lies within the specified value, an offset amount Wn of the data head is calculated and measured on the basis of the read signal. When it is judged that the offset of the data head exceeds the specified value, the data head is moved by a predetermined amount in such a direction as to eliminate the offset and the offset is again measured. The total value of the moved predetermined amount and the offset amount which was again measured is set to an offset measurement value.

Specifically speaking, when both of an inner offset read signal V1 of the first servo pattern recorded on the inner side with an offset and an outer offset read Signal V2 of the second servo pattern recorded on the outer side with an offset are obtained, an offset measuring section judges that the offset of the data head lies within the specified value, so that an offset amount is calculated on the basis of a difference between the amplitude levels of the two read signals V1 and V2. When only the read signal V1 of the first servo pattern recorded on the inner side with an offset is obtained from the data head, it is judged that the data head is offset while exceeding the specified value on the inner side. After the offset amount was predicted on the basis of the read signal V1, the data head is moved to the outer side by only the predicted offset amount and the offset amount is again subsequently measured. On the contrary, when only the read signal V2 of the second servo pattern which is offset on the outer side is derived from the data head, it is judged that the data head is offset to the outer side while exceeding the specified value. After the offset amount was predicted on the basis of the read signal V2, the data head is moved to the inner side by only the predicted offset amount and the offset amount is subsequently measured again.

In the case where it is necessary to further consider a large offset amount, subsequent to the first and second servo patterns for offset detection, a polarity servo pattern of a size exceeding the recording width of the first and second servo patterns is recorded at a specific cylinder position of each data surface of the disk medium. In this case, when both of the read signals V1 and V2 of the first and second servo patterns are not derived from the data head, the offset measuring section judges the presence or absence of a read signal V3 of the polarity servo pattern. When the read signal V3 of the polarity servo pattern is derived, the data head is moved by only a predetermined constant amount to the side opposite to the recording side of the polarity servo pattern. After that, the offset amount is again measured. When the polarity servo pattern read signal V3 is not obtained, the data head is moved by only a predetermined constant amount to the recording side of the polarity servo pattern. The offset amount is subsequently measured again.

Further, when the offset amount is large, the remeasurement of the offset which is performed by moving the data head by a predetermined amount in such a direction as to eliminate the offset is repeated a plurality of number of times by the offset measuring section until it is judged that the offset lies within the specified value. The offset measurement value in this case is set to the total amount of the head movement amount corresponding to the remeasurement of a plurality of times and the offset amount which was measured at last.

According to the disk medium of the invention, two or three servo patterns for offset detection are grouped to one set and are recorded at a plurality of positions on the track of the specific cylinder of the data surface. The offset measuring section has a memory table to store the offset amounts measured from a plurality of positions on the track of the specific cylinder of the data surface and corrects the head position on the basis of the offset amount read out from the memory table synchronously with the rotation of the disk and again measures the offset. The offset measuring section measures the offset amount every data head while switching each data head. When the power source of the apparatus is turned on, the offset amount is also measured. After the power source was turned on, the offset amount is measured every predetermined elapsed time.

Further, according to the invention, AGC amplitude information to set a reference amplitude level into the AGC amplifier to amplify the read signal from the data head is recorded at the head of the servo pattern for offset detection of the disk medium. In this case, the amplitude reference level for AGC amplification of each data head is measured from the read signal $V_{AGC}$ of the AGC amplitude information derived from the specific cylinder of each data surface by a reference amplitude level measuring section. The measured amplitude reference level is set into the AGC amplifier synchronously with the disk rotation by a level setting section.

As mentioned above, according to the invention, the AGC pattern to decide the amplitude reference value in the AGC amplifier, the two offset patterns written on the outer side and inner side from the track center, and further the signal pattern of the polarity signal written on the inner or outer side with a width wider than the offset pattern if necessary are grouped as one set and are recorded on the specific cylinder of the data surface at a plurality of positions on the track by a preformat or the like. When the offset is measured, a reference value of the amplitude level of the AGC amplification signal is first obtained by the AGC pattern read signal. When the two offset pattern signals V1 and V2 are read out, the offset amount is obtained by a difference between the amplitude levels of them. However, when the offset of the data head exceeds the specified value and only either one of the offset pattern signals V1 and V2 is read out, since the direction of the offset is known, the offset amount is predicted from the read signal V1 or V2 and the data head is moved in the track center direction by only the predicted offset amount. After that, the offset amount is again measured. When a large offset such that both of the offset pattern signals V1 and V2 are not derived occurs, the head is moved in the track center direction by only a predetermined amount in accordance with the presence or absence of the polarity signal. After that, the offset is again measured. The above operations are repeated until the two read signals V1 and V2 are derived and the offset can be measured.

In the case where the offset of the data head exceeds the specified value and both of the read signals V1 and V2 are not derived as mentioned above, the head is moved in the offset eliminating direction by only the predetermined amount or predicted value. In this state, a new offset measurement is executed. Thus, even if the servo patterns for offset detection corresponding to only one cylinder have been recorded, the data head is moved to the track center side at which the offset can be measured and the offset amount can be accurately measured. Consequently, even when an offset wider than the track pitch exists, the offset amount can be accurately measured without reducing the disk capacity due to the recording of the servo patterns for offset detection.

The above and other objects, features, and advantages of the present invention will become more apparent from the following detailed description with reference to the drawings.

BRIEF DESCRIPTION OF THE DRAWINGS

FIGS. 3A to 3E are explanatory diagrams of conventional data surface servo patterns and pattern read signals of the 2-phase servo system;

FIG. 4 is a schematic block diagram of the present invention;

FIGS. 7A to 7E are explanatory diagrams of data surface servo patterns and pattern read signals according to the invention;

FIGS. 13A to 13D are explanatory diagrams of data surface servo patterns and pattern read signals according to the second embodiment of the invention;

FIGS. 15A to 15D are explanatory diagrams of data surface servo patterns and pattern read signals according to a modification of the second embodiment of the invention.

DETAILED DESCRIPTION OF THE PREFERRED EMBODIMENTS

Figure 1A:
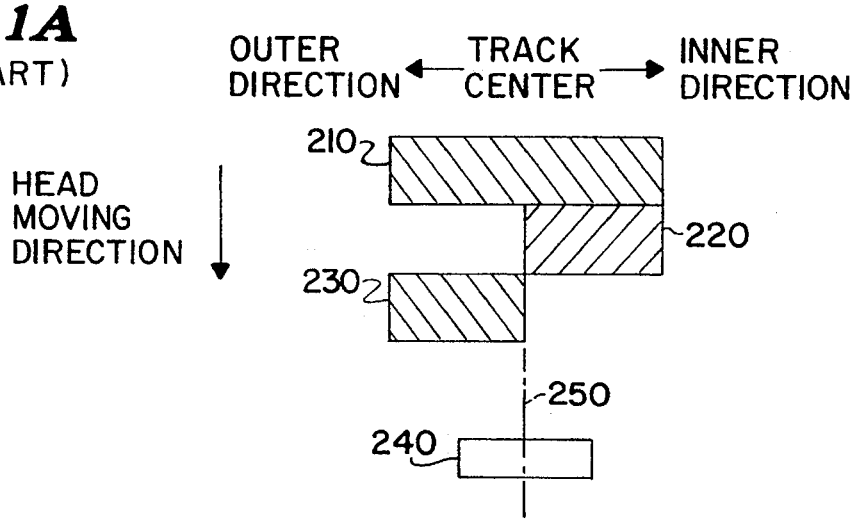
FIGS. 1A to 1E are explanatory diagrams of conventional data surface servo patterns.
Figure 1B:
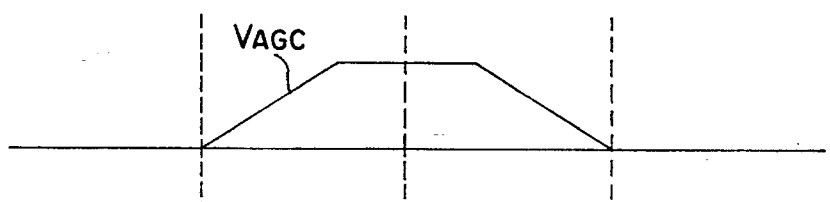
Figure 1C:
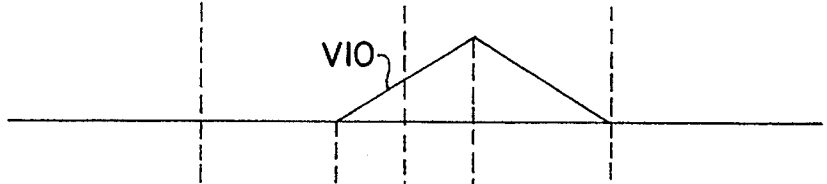
Figure 1D:
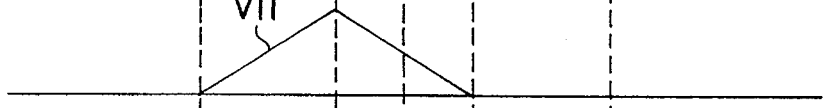
Figure 1E:
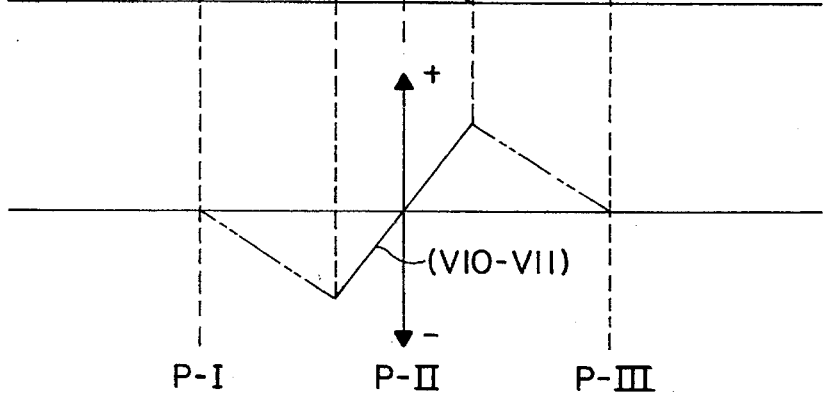
Figures 2A, 2B, 2C, 2D, 2E, 2F, 2G, 2H:
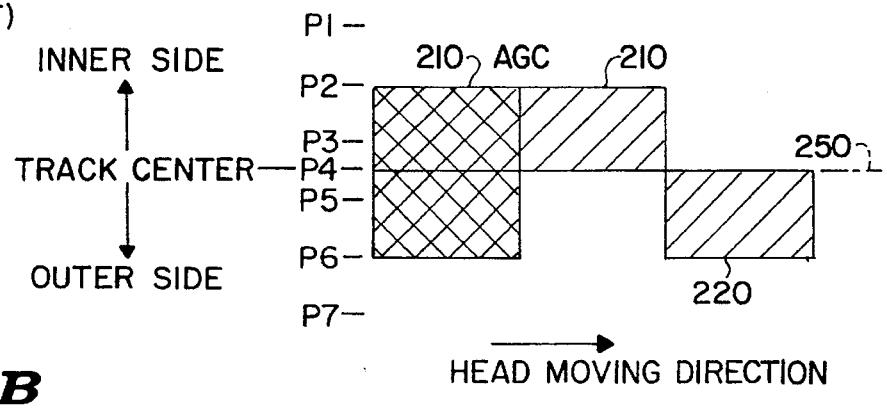
FIGS. 2A to 2H are explanatory diagrams of conventional data surface servo patterns and pattern read signals.

In FIG. 4, a disk unit of the present invention comprises: a drive control section 100; a disk controller 200; a drive 300 provided under the domination of the drive control section 100; a head section 400; and a reading/writing section 500. When the disk controller 200 receives a command and a command parameter from an upper host computer, a cylinder address obtained from the command parameter is set into the drive control section 100. The head is moved to a target cylinder address by a seeking operation of a head positioning mechanism provided for the drive 300. After completion of the seeking operation, the drive control section 100 switches the drive 300 to the on-track control, thereby allowing the head of the head section 400 to trace the track of the target cylinder address. In the on-track control state, the reading/writing section 500 executes the reading or writing operation to the disk medium through the head section 400. Write data to the reading/writing section 500 is supplied from the upper host computer through the disk controller 200. Read data read out from the head section 400 is transferred to the upper host computer via the disk controller 200.

Figure 5:
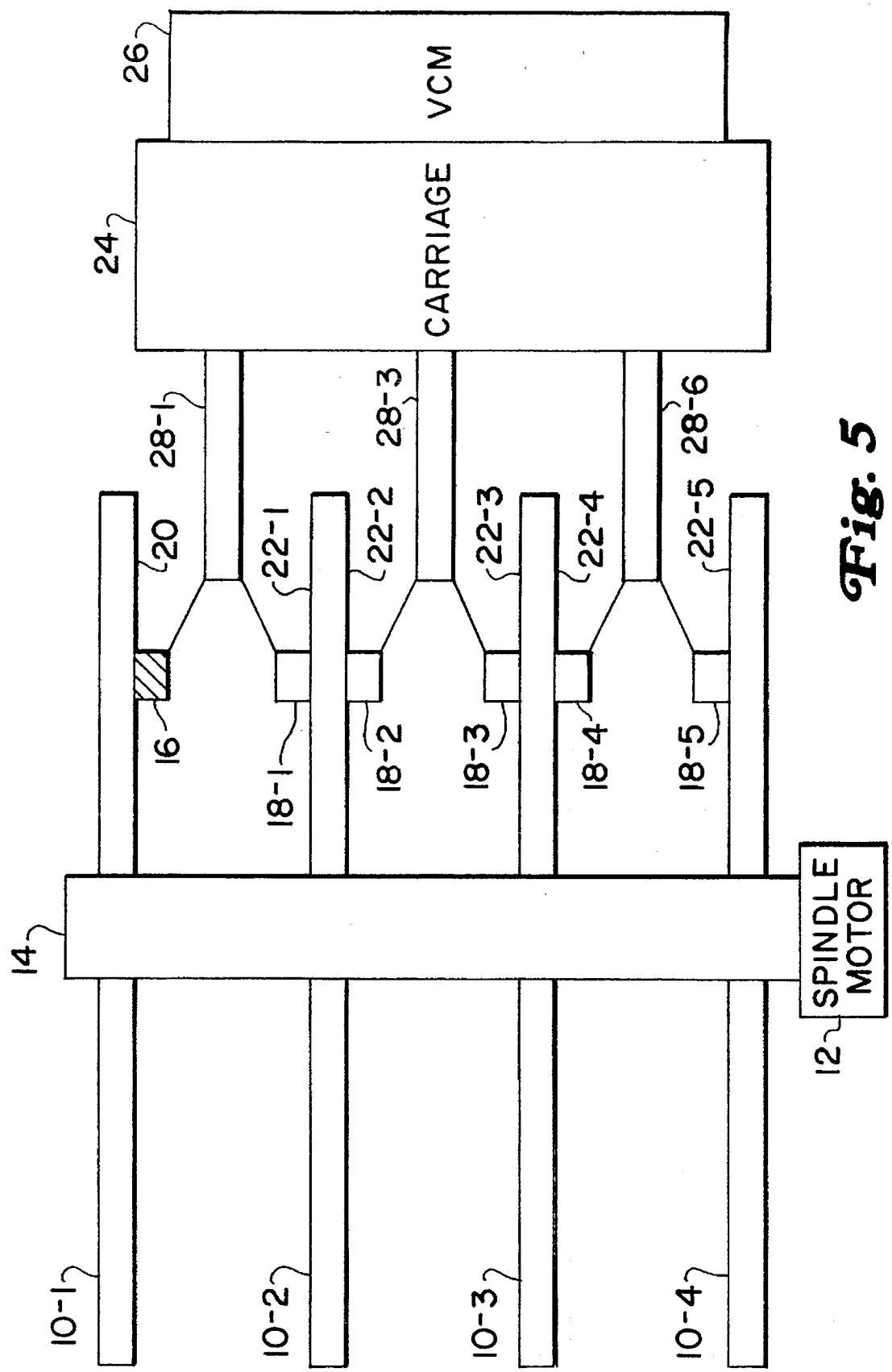
FIG. 5 is an explanatory diagram of a driving mechanism of FIG. 4.

FIG. 5 shows a mechanism of the drive 300 and head section 400 in FIG. 4. For example, four disk media 10-1 to 10-4 are loaded to a spindle 14 of a spindle motor 12 and are rotated. The inside surface of the top disk medium 10-1 is a servo surface 20. Predetermined servo patterns have been recorded every track on the servo surface 20. Data surfaces 22-1 to 22-5 are formed on the remaining disk media 10-2 to 10-4. A servo head 16 is arranged for the servo surface 20. Since the servo head 16 is used only to read out the servo surface 20, one read head is provided. Data heads 18-1 to 18-5 are arranged for the data surfaces 22-1 to 22-5, respectively. Each of the data heads 18-1 to 18-5 has a write head using a magnetic head and a small read head using a magnetoresistive device. Servo patterns for offset detection have been recorded on tracks at specific cylinder positions of the data surfaces 22-1 to 22-5. For example, one or a plurality of cylinders on the outermost side are assigned as specific cylinders of the data surfaces 22-1 to 22-5 to record the servo patterns for offset detection. The servo head 16 and data heads 18-1 to 18-5 are supported at the edges of the head arms 28-1 to 28-3 every two heads. The head arms 28-1 to 28-3 are attached to a carriage 24 and are swung by a voice coil motor (hereinafter, referred to as a "VCM") 26 around the carriage 24 as a center in such a direction as to traverse the tracks on the medium surface.

Figure 6:
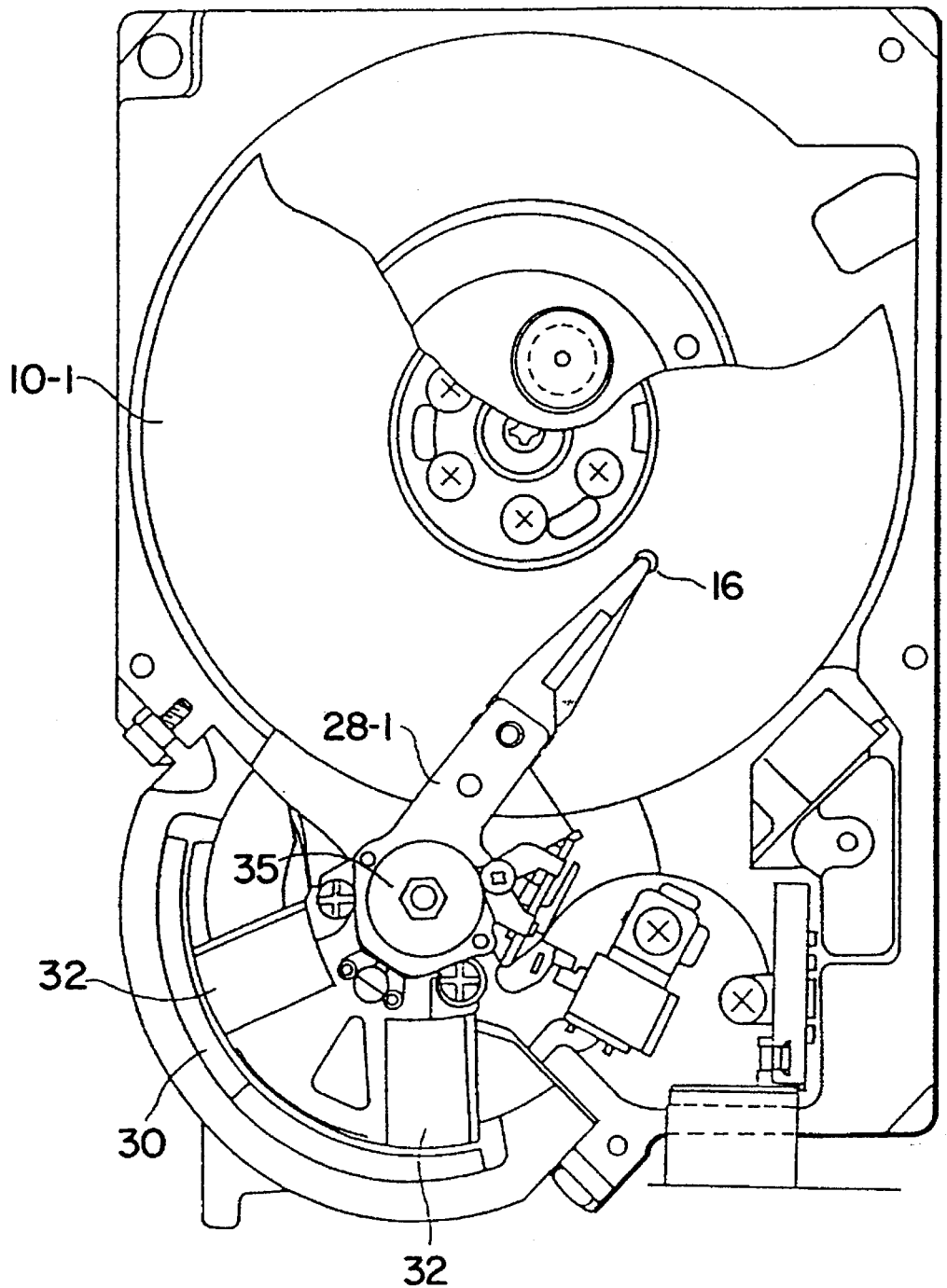
FIG. 6 is an explanatory diagram of a structure of an apparatus of the invention with a part cut away.

FIG. 6 shows specific structures of the drive and the head section of the invention with a part cut away. The servo head 16 attached at the edge of the head arm 28-1 which is rotated by a rotary shaft is supported for the disk medium 10-1 which is rotated by the spindle motor. The carriage 24 comprises a magnetic circuit 30 on the fixed side and a movable coil 32 provided on the head arm 28-1 side. The carriage 24 rotates the head arm 28-1 around the rotary shaft 35 as a center within the range of the medium surface of the disk medium 10-1.

Servo signal patterns for offset detection as shown in FIG. 7A have previously been recorded on the track of the outermost cylinder of each of the data surfaces 22-1 to 22-5 of the disk media 10-2 to 10-5 in FIG. 5 when the data surface is preformatted. FIG. 7A shows one of the patterns for offset detection recorded on the specific cylinder of the data surface. The track on which the pattern for offset detection has been recorded is shown in the vertical direction as shown at a track center 126. It is assumed that a data head 18 has been positioned at the track center 126 as shown in the diagram. The position of the data head 18 is fixed and the track moves by the medium rotation for the data head. However, for simplicity of explanation, it is assumed that the medium track side is fixed and the data head 18 relatively moves downward as shown by an arrow in the head moving direction.

For such a relative moving direction of the data head 18, an AGC pattern (AGC amplitude information) 124, an inner offset pattern (first servo pattern) 130, an outer offset pattern (second servo pattern) 140, and a polarity signal pattern (polarity servo pattern) 150 are sequentially provided as patterns for offset detection.

The AGC signal pattern 124 is symmetrically provided on the inner side and outer side around the track center 126 and are recorded with an enough large width than the data head 18. For example, assuming that the width of data head 18 is set to $W_0$, the AGC signal pattern 124 has a width of $4W_0$ in this example. The AGC pattern 124 is used to set a reference value of the amplitude level of the AGC amplifier which is used to amplify the read signal from the data head 18. The next inner offset pattern 130 is a pattern formed in the inner direction (right direction shown in the diagram) for the track center 126 as a start point. A width of inner offset pattern 130 is equal to, for example, the width $W_0$ of data head 18.

The next outer offset pattern 140 is formed in the outer direction (left direction shown in the diagram) for the track center 126 as a start point. In the embodiment, the width of outer offset pattern 140 is set to the same width $W_0$ of data head 18 as that of the inner offset pattern 130. In the embodiment, the polarity pattern 150 provided finally is formed in the inner direction for the track center 126 as a start point and has a width exceeding the inner offset pattern 130. For example, the width of polarity pattern 150 is equal to $2W_0$ that is twice as large as the width $W_0$ of inner offset pattern 130. Each of the AGC pattern 124, inner offset pattern 130, outer offset pattern 140, and polarity pattern 150 is a magnetic recording pattern using a signal of a frequency that is enough higher than the recording frequency of the disk unit. Specifically speaking, those patterns are recorded by using the signal of the same frequency as that of the signal used when writing the servo patterns formed on the servo surface.

FIGS. 7B to 7E show amplitude levels of read signals of the patterns for the position of the data head 18 in FIG. 5A. FIG. 7B shows the amplitude level of the AGC read signal $V_{AGC}$ obtained by reading the AGC pattern 124. The AGC read signal $V_{AGC}$ is at the constant amplitude level in a range where the data head 18 lies in the AGC pattern 124. This AGC read signal attenuates when the data head 18 moves in the outer direction or inner direction. FIG. 7C shows the amplitude level of the read signal V1 of the inner offset pattern 130. When the data head 18 is located at the track center 126 as shown in the diagram, a read signal V1 is set to the value of ½ of the amplitude level peak value. When the data head 18 is offset from the track center 126 toward the outer side, the read signal V1 attenuates. When the data head is offset toward the inner side, the level of the read signal V1 increases. With respect to the offset in the inner direction, when the data head 18 completely overlaps the inner offset pattern 130, the amplitude level of the read signal V1 reaches the peak value. After that, when the data head is further offset in the inner direction, the data head 18 is gradually deviated from the inner offset pattern 103, so that the amplitude level attenuates.

FIG. 7D shows the amplitude level of the read signal V2 of the outer offset pattern 140. A read signal V2 is set to the level of ½ of the amplitude peak level when the data head 18 shown in the diagram is located at the track center 126. When the data head 18 is offset in the inner direction, the read signal V2 is attenuated and is finally set to the 0 level. On the contrary, when the data head 18 is offset in the outer direction, the amplitude level increases. The level reaches the peak level at the position where the data head 18 completely overlaps the outer offset pattern 140. Further, when the data head 18 is offset in the outer direction and is deviated from the outer offset pattern 140, the amplitude level is attenuated in accordance with a degree of deviation and is finally set to the 0 level. The changes of the amplitude levels of the read signals V1 and V2 shown in FIGS. 7C and 7D show the symmetrical level patterns for the track center 126. Therefore, a difference (V1−V2) between the inner offset read signal V1 and the outer offset read signal V2 has a value which is proportional to the offset amount of the data head 18 for the track center 126. Therefore, an offset amount W of the data head 18 can be detected on the basis of the difference signal (V1−V2).

Figure 8:
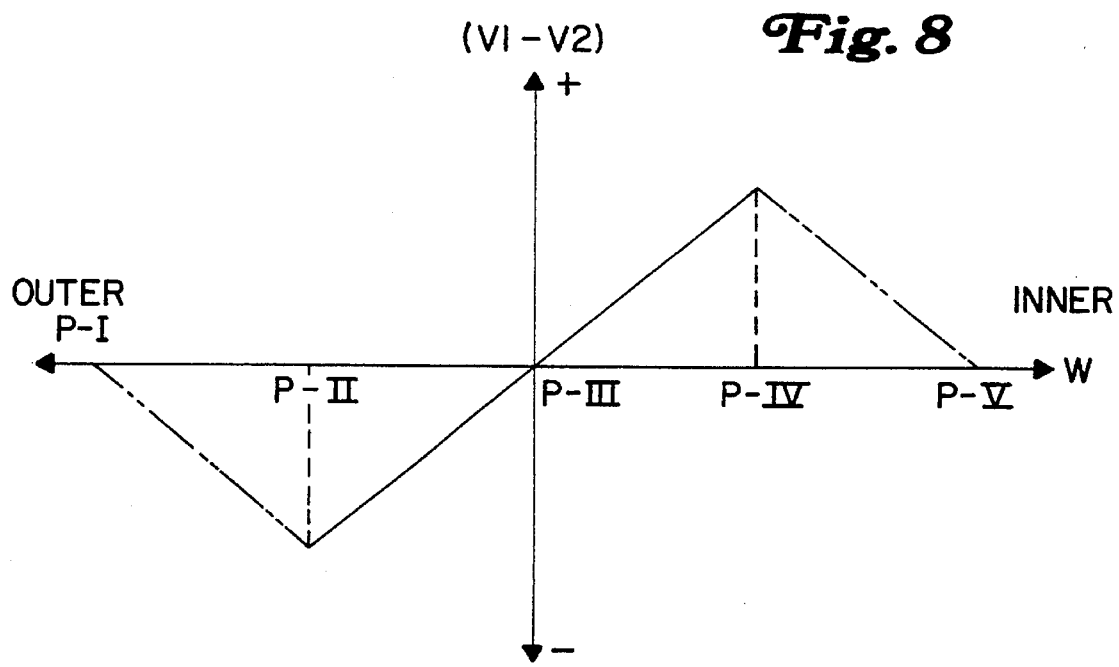
FIG. 8 is a characteristics diagram of a level difference of pattern read signals and an offset in the invention.

FIG. 8 is a characteristics diagram of the positional relation between the difference signal (V1−V2) and the data head 18. As for the head position of an axis of abscissa, the track center 126 is set to P-III, a position at which the amplitude level of the outer offset read signal V1 is set to 0 in the outer direction is set to P-II, and a position where the amplitude level of the inner offset read signal V1 is set to 0 in the inner direction is set to P-V. When the head position moves in the inner direction from the track center P-III as an origin, the difference signal (V1−V2) linearly increases in the plus direction. When the head position passes through a position P-V, the difference signal linearly decreases. When the head moves in the outer direction, the difference signal (V1−V2) linearly decreases in the minus direction. When the head position passes through a position P-IV, the difference signal contrarily starts to linearly increase.

The difference signal (V1−V2) is effectively obtained within a range from the head position P-II to P-IV. Within such a range, the head position, namely, the offset amount W can be accurately detected on the basis of the difference signal (V1−V2). On the other hand, as will be obviously understood from FIGS. 7C and 7D, the region exceeding the position P-II on the outer side and the region exceeding the position P-IV in the inner direction are the region where only the outer offset read signal V2 or inner offset read signal V1 is obtained. In case of such a region, since the fluctuations of the read signals are not set off as in case of the difference signal, it is difficult to detect the accurate head position from the amplitude level. Therefore, with respect to the range from the position P-II to P-I in the outer direction and the range from the position P-IV to P-V in the inner direction, they are set to a range to obtain the head position that is predicted from the read signal V1 or V2, namely, the prediction offset amount W.

Specifically speaking, when it is assumed that an inclination of the straight line in FIG. 6 is set to +K in case of increasing and to −K in case of decreasing, the offset amount W in the range from the head position P-II to P-IV in which the difference signal (V1−V2) is effectively obtained is obtained by the following equation.

$$W = K(V1 - V2)$$

On the other hand, the offset W in the range from the position P-IV to P-V in the inner direction in which only the inner offset read signal V1 is obtained is predicted by the following equation.

$$W = W_0 + (W_0 - K \times V1)$$

With respect to the range from the position P-II to P-I in the outer direction in which only the outer offset read signal V2 is obtained, the offset W is predicted by the following equation.

$$W=-W_0+(-W_0+K\times V2)$$

The offset W which is calculated by each of the above equations indicates the offset in the inner direction so long as it has a plus value. The offset W indicates the offset in the outer direction so long as it has a minus value.

FIG. 7E shows the amplitude level of a polarity signal V3 obtained by reading the polarity pattern 150 provided finally. In the embodiment, since the polarity pattern 150 is provided in the inner direction, in a manner similar to the inner offset read signal V1 in FIG. 7C, the pattern 150 is set to the value of ½ of the peak value of the amplitude level when the data head 18 is located at the track center 126. When the data head is offset in the outer direction, the amplitude level linearly decreases and is set to 0. When the data head moves in the inner direction, the level linearly increases and reaches the peak level at the position where the data head 18 completely overlaps the polarity pattern 150. After that, the peak level is held. Since the polarity pattern 150 is formed so as to have a width larger than that of the inner offset pattern 130, even if the read signal V1 is not derived by the offset of the data head 18 in the inner direction, the polarity signal V3 is still obtained. That is, even in the region from the position P-IV to P-V in which the inner offset read signal V1 is not derived, only the polarity signal V3 is still obtained.

When both of the read signal V1 on the inner side and the read signal V2 on the outer side are not obtained, if the polarity pattern 150 doesn't exist, it is unknown whether the data head 18 is offset in the inner direction or is offset in the outer direction. In the invention, however, since the polarity pattern 150 is newly provided, in the case where both of the read signal V1 and the read signal V2 are not obtained, the polarity signal V3 is checked. When the polarity signal V3 is obtained, it will be understood that the data head 18 is offset in the inner direction. In this case, therefore, it is sufficient that the data head 18 is returned in the outer direction by a predetermined amount so as to obtain the read signal V1 and the offset is again measured. When the polarity signal V3 is not obtained, the data head 18 is offset in the outer direction. In this case, it is sufficient that the data head is returned in the inner direction by a predetermined amount so as to obtain the outer offset read signal V2 and the offset is again measured.

In the embodiment of the invention, only when the polarity signal V3 is obtained, namely, when the data head 18 is offset in the inner direction exceeding the position P-IV, for example, the data head is returned in the outer direction by only a width $W_{const}$, in a range from the position P-III of the track center 126 to the position P-IV at which the read signal V1 is not obtained. The offset is again measured. When all of the signals including the polarity signal V3 are not obtained, the data head 18 is located on the outer side over the position P-II in the outer direction. Therefore, the data head is returned in the inner direction by only the distance $W_{const}$, for instance, in a range from the position P-III of the track center 126 to the position P-II at which the outer offset read signal V2 is not derived. The offset is again measured.

The predetermined amount $W_{const}$ to return the data head 18 in the direction of the track center in the case where only the polarity signal V3 is obtained or the polarity signal is also not derived can be properly decided so long as it lies within a range which doesn't exceed the distance from the position P-III as a track center 126 to the position P-V in the inner direction or the position P-I in the outer direction. In the embodiment, since the width from the track center to the position P-IV or P-II is equal to the width $W_0$ of the data head 18 and the width from the track center to the position P-V or P-I is equal to $2W_0$ which is two times as large as the width $W_0$ of the data head, it is sufficient to determine $W_{const}$ within a range of $W_0$ to $2W_0$.

Figure 9:
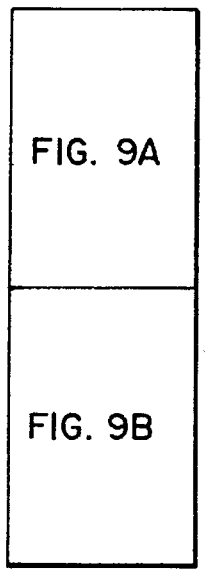
FIG. 9 is a sheet layout arrangement to facilitate the understanding of FIGS. 9A and 9B, FIGS. 9A and 9B are a block diagram of an embodiment of the invention.
Figure 9A:
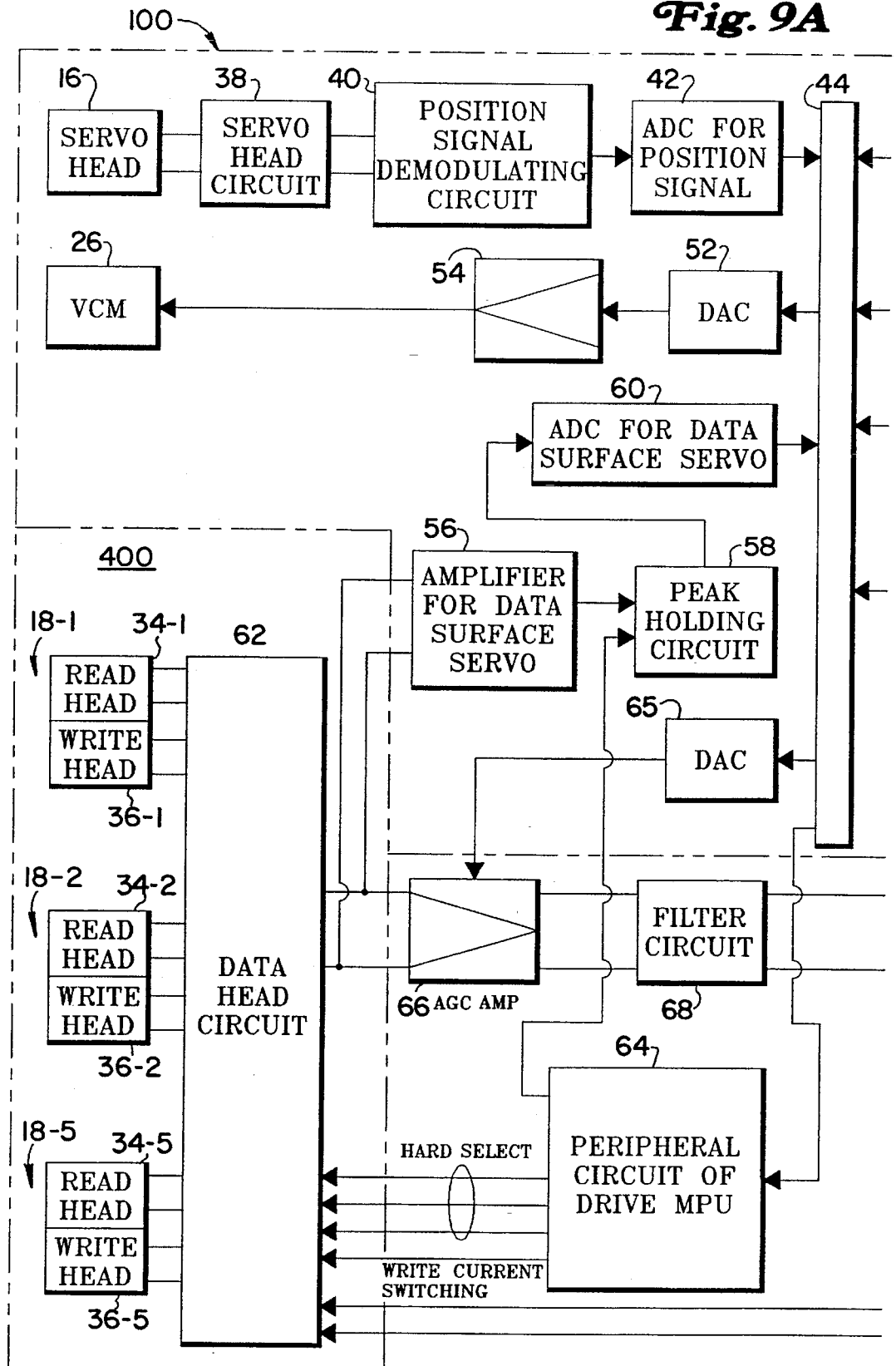
Figure 9B:
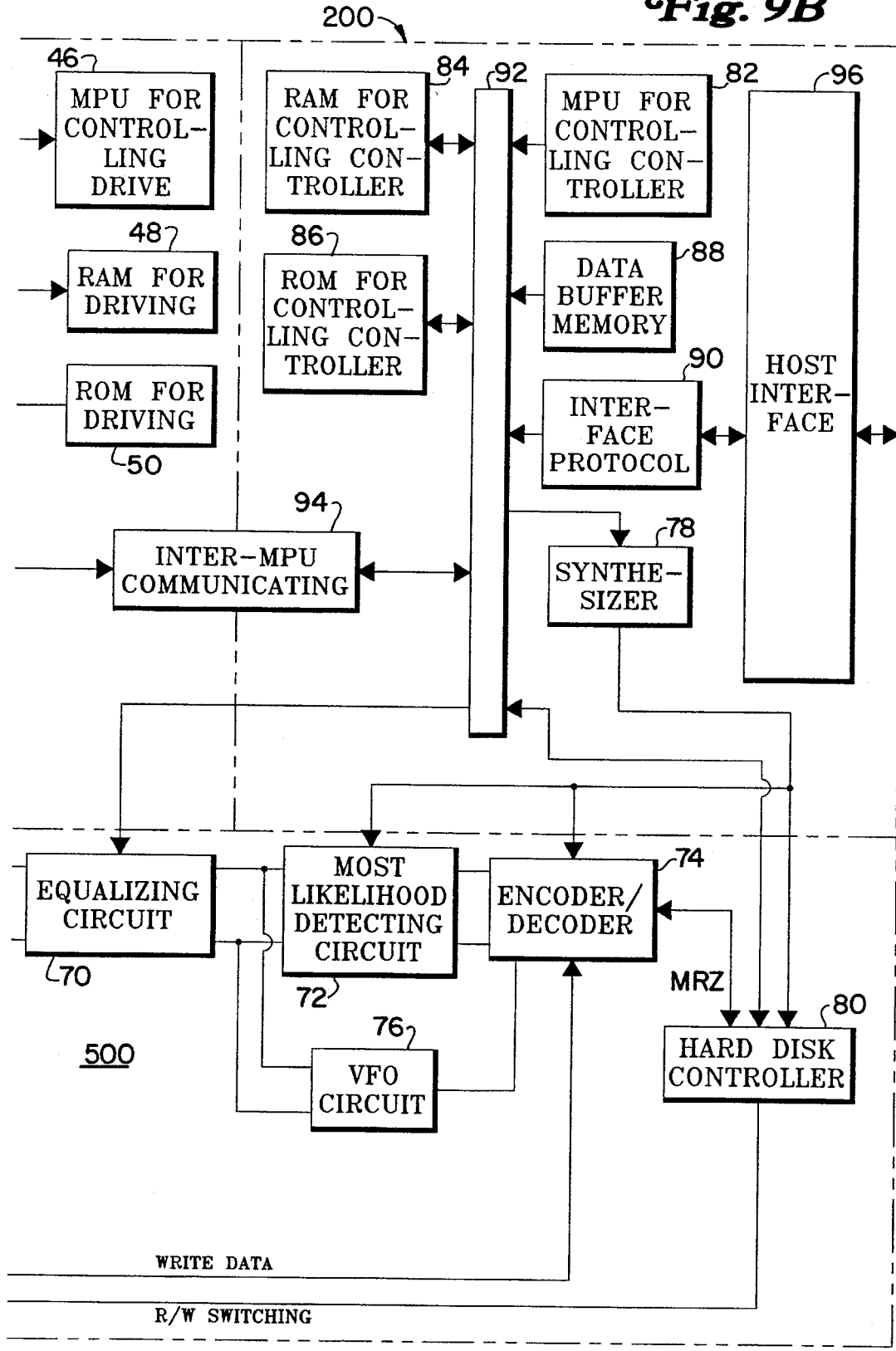

FIG. 9 is a sheet layout arrangement to facilitate the understanding of FIGS. 9A and 9B. The FIGS. 9A and 9B show an embodiment of a hardware construction of a disk unit of the invention. The disk unit of the invention comprises the drive control section 100, drive controller 200, head section 400, and reading/writing section 500. First, the drive control section 100 will be explained. A servo signal from the servo head 16 provided in correspondence to the servo surface of the disk medium is subjected to an analog process by a servo head circuit 38. A position signal which linearly increases in the range of the track width in accordance with the head position and is inverted each time the head traverses the track is demodulated by a position signal demodulating circuit 40. The analog position signal demodulated by the position signal demodulating circuit 40 is converted to the digital data by an A/D converter 42 for position signal. The digital data is supplied to an MPU 46 for drive control through an MPU bus 44. An RAM 48 for driving and an ROM 50 for driving in which a control program for driving has been stored are connected to the MPU 46 for drive control through the MPU bus 44.

The MPU 46 for drive control executes the seeking operation according to a seek command which is notified from the upper disk controller 200 and an on-track operation after completion of the seeking operation. At the time of the activation when the power source of the apparatus is turned on, the data head is sought to the specific cylinder on which the patterns for offset detection in FIG. 7A have been recorded and the data head is switched, thereby measuring the amplitude reference level for the AGC amplifier for every data surface and measuring the offset amount. After the power source was turned on, the measurement of the AGC amplitude reference level and the measurement of the offset amount are executed in accordance with a predetermined time schedule. That is, factors of the offset in the disk apparatus mainly depend on an environmental temperature of the apparatus. Therefore, a schedule management is performed in a manner such that just after the power source was turned on, the measuring process is executed at a short interval and the interval of the measuring process is increased with the elapse of time. The measuring process of the reference amplitude level of the AGC and the offset amount is realized as one of the functions by the program in the MPU 46 for drive control.

The drive data calculated by the MPU 46 for drive control at the time of the seeking operation or on-track operation is converted to the analog voltage by a D/A converter 52 and is amplified by a power amplifier 54. After that, the amplified data is supplied to the VCM 26. Further, the drive control section 100 includes an amplifier 56 for data surface servo, a peak holding circuit 58, and an A/D converter 60 for data surface servo as circuits for processing the servo patterns for offset detection recorded, for example, on the outermost peripheral track of the data surface of the disk medium. That is, in the offset measuring process using the servo patterns of the data surface, the data heads 18-1 to 18-5 provided for the head section 400 are sought and on-tracked to the outermost peripheral track of the data surface on which the servo patterns were recorded. After that, the data heads 18-1 to 18-5 are sequentially switched. Servo signals from the data surface which are derived in this instance are amplified by the amplifier 56 for data surface servo. A peak value of the amplitude level of each read signal is detected by the peak holding circuit 58 and is converted to the digital data by the A/D converter 60 for data surface servo. The digital data is supplied to the MPU 46 for drive control and the measuring process of the amplitude reference level of the AGC and the offset amount is executed.

The AGC amplitude reference level and offset amount for each data surface which were measured by the MPU 46 for drive control are stored as table data into the RAM 48 for driving. As servo patterns for offset detection provided on the outermost peripheral cylinder of each data surface, for example, sixteen servo patterns are recorded on the track at regular intervals. By obtaining measurement data with respect to those 16 patterns, continuous measurement data corresponding to one rotation is obtained. When the data head is sought to a specific cylinder position in association with the reading operation or writing operation, the servo patterns are read out in correspondence to the head number switched at that time. The offset correction is performed and the AGC reference amplitude level is set. That is, the head position signal corresponding to the cylinder address designated by the command is corrected by the MPU 46 for drive control on the basis of the offset amount read out from the RAM 48 for driving. The corrected signal is supplied to the VCM 26. The MPU 46 for drive control converts the amplitude reference level read out from the RAM 48 for driving to the analog signal by a D/A converter 65 and sets the analog signal into an AGC amplifier 66.

The disk controller 200 will now be described. An MPU 82 for controlling the controller is provided for the disk controller 200. An RAM 84 for controlling the controller, an ROM 86 for controlling the controller, a data buffer memory 88, an interface protocol section (SCSI or the like) 90, a synthesizer 78, and an inter-MPU communicating section 94 are connected to an MPU bus 92 of the MPU 82 for controlling the controller. The MPU 82 for controlling the controller receives a command and a command parameter from the host computer through a host interface 96 and the interface protocol section 90 and controls the drive control section 100, head section 400, and reading/writing section 500 on the basis of the results of the analysis. For example, when the MPU 82 for controlling the controller receives a write command from the host computer, the MPU 82 notifies a seek command and a cylinder address to the MPU 46 for drive control via the inter-MPU communicating section 94, thereby performing the seeking operation. When a device end indicative of the completion of the seeking operation is obtained from the MPU 46 for drive control of the drive control section 100, the MPU 82 for controlling the controller instructs the head switching to a data head circuit 62 of the head section 400 and selects a writing state of the track of the specific data surface in the designated cylinder address. At the same time, the reading/writing section 500 is activated and the write data which has already been received from the host computer is read out and transferred and written into the data buffer memory 88. When a read command is received, the MPU 82 for controlling the controller generates a seek command and a cylinder address to the drive control section 100 in a manner similar to the above. When receiving a seek completion response, the head switching operation of the data head circuit 62 of the head section 400 and the reading operation in the reading/writing section 500 are executed. The read data is stored into the data buffer memory 88 and, after that, it is transferred to the host computer.

Further, since the embodiment of FIGS. 9A and 9B relate to the disk unit using a CDR (Constant Density Recording) format, a frequency control of a clock frequency of a read clock or write clock by the synthesizer 78 is executed. That is, according to a disk medium of the CDR format, tracks provided in the circumferential direction are divided into a plurality of zones in the radial direction and by using a clock signal of a different frequency every zone, information is read or written at a predetermined linear density. Therefore, since the clock frequency which is used differs every zone, the frequency division data or the like to obtain the clock frequency corresponding to the access zone is read out from the table and is set into the synthesizer 78 provided for the disk controller 200. The clock frequency of the read clock or write clock to the reading/writing section 500 is controlled to the frequency adapted to the zone. The synthesizer 78 is unnecessary for the CVR (Constant Angular Velocity Recording) format instead of the CDR format.

The head section 400 will now be described. In the embodiment, five data heads 18-1 to 18-5 are provided for the head section 400. The data heads 18-1 to 18-5 comprise read heads 34-1 to 34-5 and write heads 36-1 to 36-5, respectively. The write heads 36-1 to 36-5 use the magnetic heads. The read heads 34-1 to 34-5 use MR (Magnetoresistive) heads using magnetoresistive devices. Since the MR head can be sufficiently miniaturized as compared with the magnetic head, a high density of the disk medium having a fixed track width is realized. When receiving a head selection signal from a peripheral circuit 64 for drive MPU of the reading/writing section 500, the data head circuit 62 switches either one of the data heads 18-1 to 18-5, thereby selecting the corresponding write head or read head. Further, in the writing operation, a switching control of a write current is performed by the peripheral circuit 64 for drive MPU. The data head circuit 62 is ordinarily prepared as a head IC.

The reading/writing section 500 will now be described. A hard disk controller 80 is provided for the reading/writing section 500. The hard disk controller 80 performs the transmission and reception of data between the controller 80 and the data buffer memory 88 of the disk controller 200 and executes the whole control of the reading operation and writing operation. An analog read signal obtained from the head section 400 is amplified by the AGC amplifier 66. After that, the signal passes through a filter circuit 68 and its waveform is equalized by an equalizing circuit 70. The signal is subsequently supplied to a most likelihood detecting circuit 72 and a VFO circuit 76 and a read bit train is demodulated. A reference signal of an amplitude level which has previously been measured is supplied from the D/A converter 65 to the AGC amplifier 66 synchronously with the disk rotation. The reference amplitude level for the optimum AGC control is set. Outputs of the most likelihood detecting circuit 72 and VFO circuit 76 are supplied to an encoder/decoder 74 which has been switched to the decoder side in the reading mode. The read data is reconstructed and is transferred to the data buffer 88 of the disk controller 200 via the hard disk controller 80. On the other hand, in the writing operation, the write data read out from the data buffer 88 is supplied via the hard disk controller 80 to the encoder/decoder 74 which has been switched to the encoder side for the writing operation. The encoder/decoder 74 executes the conversion to a 2–7 run length code or the like, addition of an ECC check code, and the like. After that, the data is supplied to the write head in the data head selected in this instance via the data head circuit 62 of the head section 400.

Figure 10:
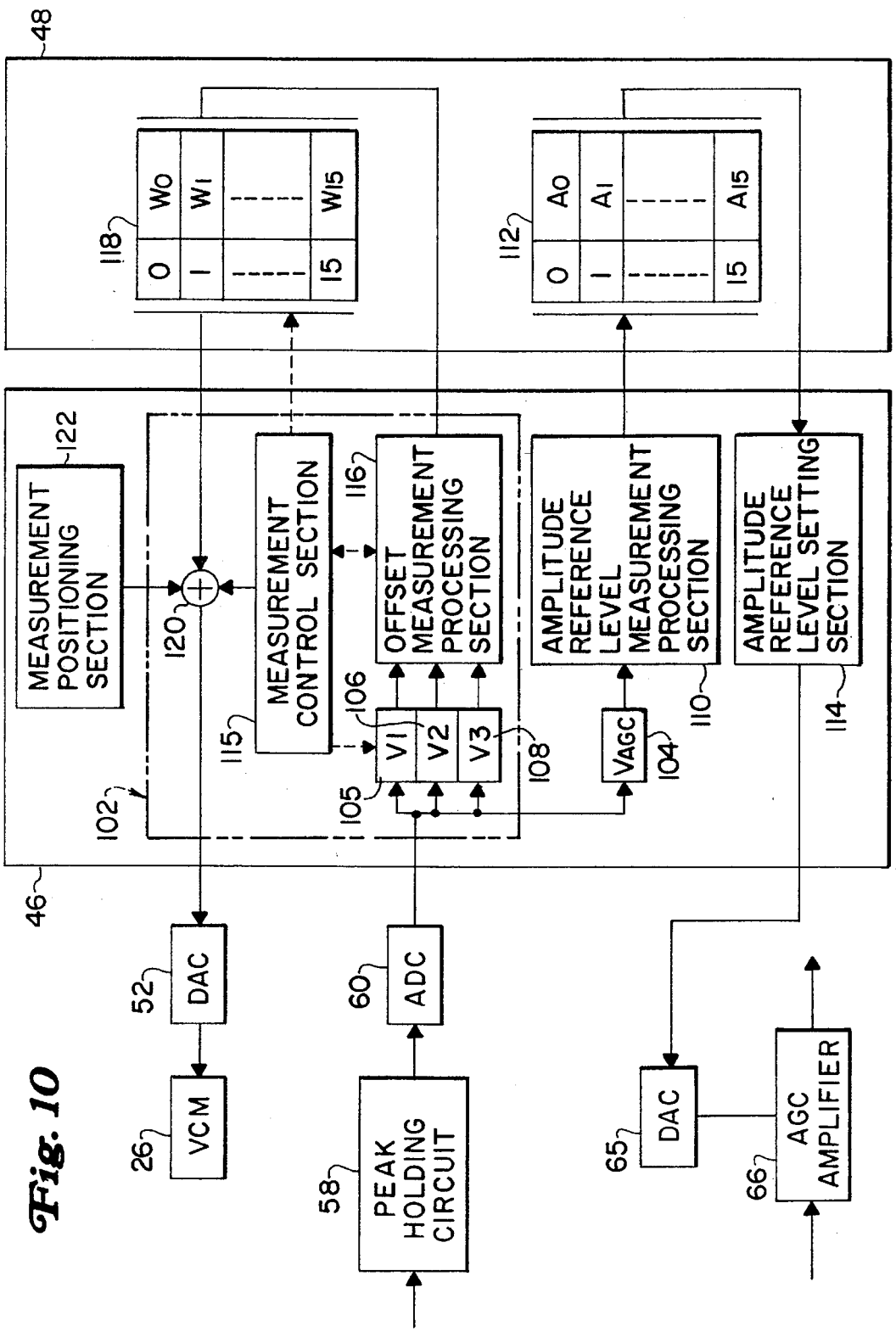
FIG. 10 is a block diagram of an offset measuring function of the invention.

FIG. 10 shows an offset measuring function of the invention which is realized by the MPU 46 for drive control provided for the drive control section 100 in FIG. 9. An amplitude reference level measurement processing section 110 and an offset measurement processing section 102 are provided for the MPU 46 for drive control. A register 104 to store the AGC read signal $V_{AGC}$ obtained by reading the servo patterns on the specific cylinder of the data surface is provided at the front stage of the amplitude reference level measurement processing section 110. After the AGC read signal $V_{AGC}$ obtained by reading the patterns of FIG. 7A was detected by the peak holding circuit 58, it is converted to the digital data by the A/D converter 60. The digital data is stored into the register 104. Registers 105, 106, and 108, a measurement control section 115, an offset calculating section 116, and an offset correcting section 120 are provided for the offset measurement processing section 102. Peak values of the read signal V1, outer offset read signal V2, and polarity signal V3 which were read from the patterns of FIG. 7A are detected by the peak holding circuit 58 and are converted to digital data by the A/D converter 60. The digital data is stored into the registers 105, 106, and 108. The measurement control section 115 executes a whole control process at the time of the scheduling of the offset measuring process, offset measurement, and the like. The offset calculating section 116 executes the arithmetic operation of the offset measurement value based on the read signals V1 and V2, predictive arithmetic operation of the offset amount which is used in the correction of the head position in the case where only either one of the read signals V1 and V2 is obtained, and further the setting of the predetermined offset amount which is used in the correction of the head position based on the presence or absence of the polarity signal V3. To a head positioning signal to the specific cylinder from a measurement positioning section 122, an offset correcting section 120 executes a signal correction for moving the data head in such a direction as to eliminate an offset and again measuring the offset by using an offset measurement value read out from an offset table 118. An amplitude reference level table 112 to store the measurement result of the amplitude reference level measurement processing section 110 is provided in the RAM 48 for driving. The offset table 118 to store the measurement result of the offset measurement processing section 102 is also provided. The amplitude reference level table 112 includes addresses 0 to 15 corresponding to, for example, sixteen servo patterns recorded on the track of the specific cylinder of the data surface. Amplitude reference levels $A_0$ to $A_{15}$ which were measured are stored in those addresses. The data stored in the amplitude reference level table 112 is read out synchronously with the disk rotation in which an index of the data surface is used as a reference. The read data is supplied to the D/A converter 65 from the amplitude reference level setting section 114 of the MPU 46 for drive control and is converted to the analog signal. After that, a reference amplitude level is set into the AGC amplifier 66.

The offset table 118 to store the measurement result of the offset measurement processing section 102 also includes table addresses 0 to 15 corresponding to the sixteen measurement patterns recorded on the specific cylinder of the data surface. Offset amounts $W_0$ to $W_{15}$ obtained as measurement results are stored in those addresses. The data stored in the offset table 118 is read out synchronously with the rotation of the disk medium in which the index is used as a reference and is supplied to the offset correcting section 120. The head positioning signal to position the data head to the specific cylinder is supplied to the offset correcting section 120 from the measurement positioning section 122 at the time of the offset measurement. The head positioning signal is corrected by the offset measurement value read out from the offset table 118 when the offset is again measured. The corrected signal is supplied to the VCM 26 through the D/A converter 52. When the offset is again measured, consequently, the offset correction to move the head in such a direction as to eliminate the offset is executed. The data head is moved in the track center direction, thereby forming a state such as to enable the offset measurement in which both of the read signals V1 and V2 are obtained.

Figure 11A:
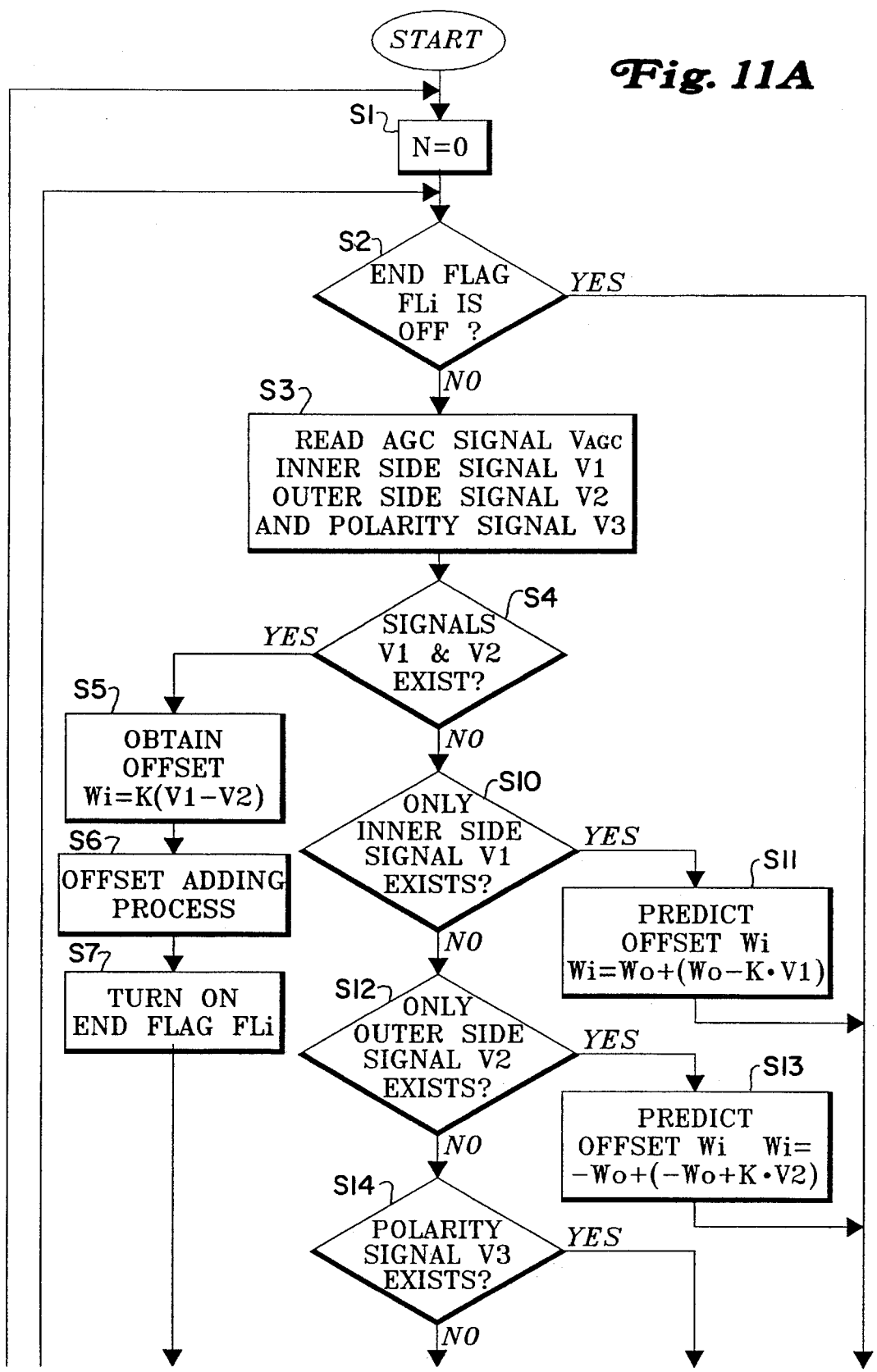
FIG. 11 is a sheet layout arrangement to facilitate the understanding of FIGS. 11A and 11B, FIGS. 11A and 11B are a flowchart for an offset measuring process of the invention.
Figure 11B:
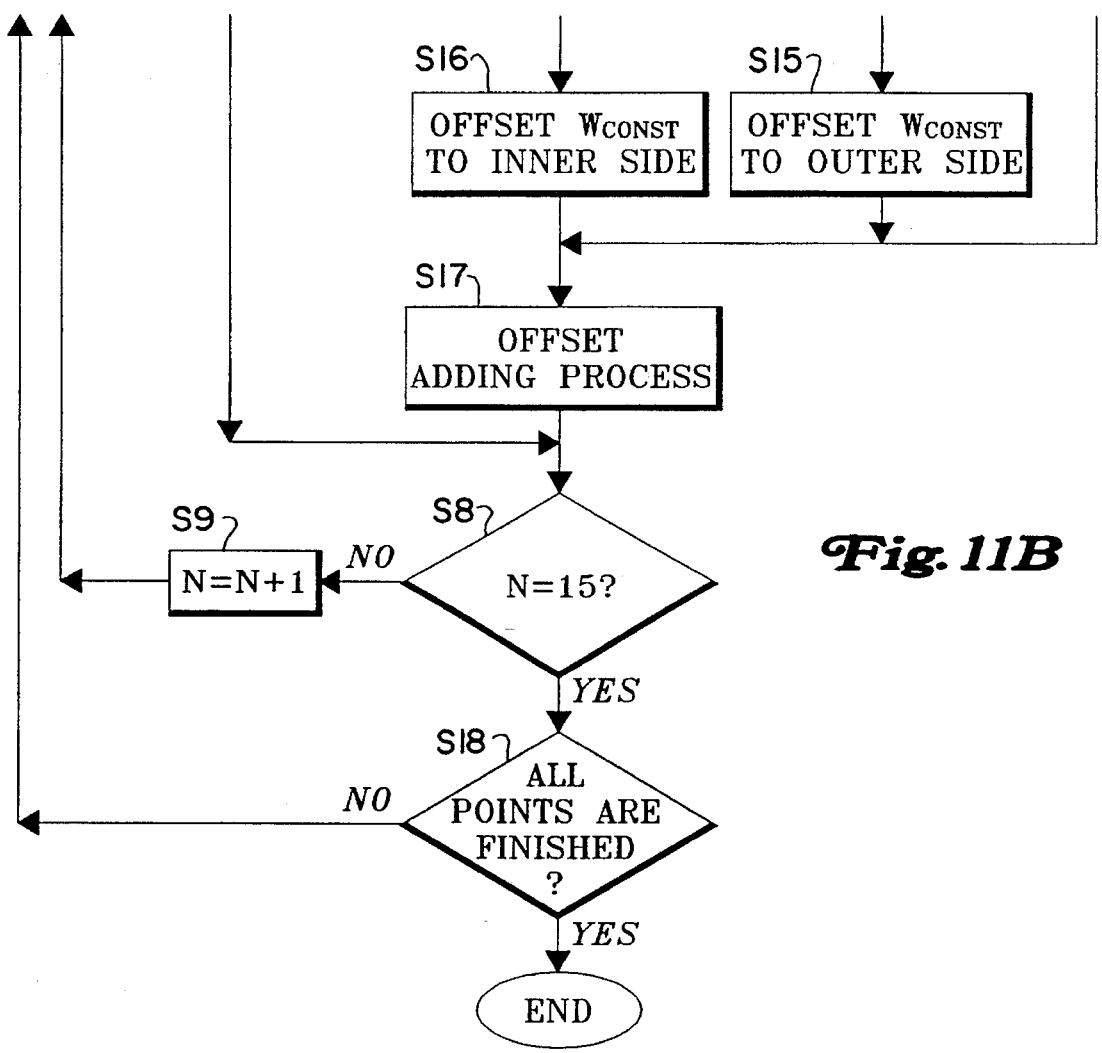
Figure 11:
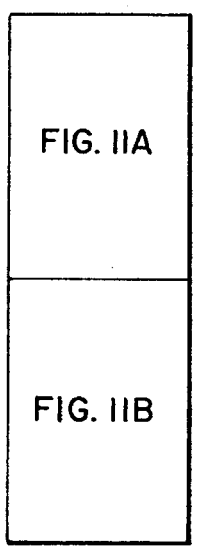

FIG. 11 is a sheet layout arrangement to facilitate the understanding of FIGS. 11A and 11B. The flowcharts 11A and 11B show the offset amount measuring process by the offset measurement processing section 102 of FIG. 10. When the offset measuring process is activated by the turn-on of the power source of the disk apparatus or the like, the data head is positioned for measurement to the specific cylinder. After that, processes are executed after from S1. First in step S1, a counter (N) indicative of the number of servo patterns for offset detection recorded in the track direction of the specific cylinder is initialized to 0. In the embodiment, a case where sixteen servo patterns have been recorded on the track at regular intervals is described as an example. In step S2, a check is made to see if an end flag FLi indicative of the presence or absence of the end of the measuring process of the servo pattern to be processed at present among 16 patterns on the track is on or not. The number of recording points of the servo patterns on one track is indicated by (i=0, 1, 2, ..., 15). When the end flag FLi is not on, this means that the measurement of the servo pattern is not finished. Therefore, the processing routine advances to a measuring process in step S3 and subsequent steps. First in step S3, the AGC read signal $V_{AGC}$, read signal V1, outer offset read signal V2, and polarity signal V3 are read. A check is now made to see if both of the read signal V1 and the outer offset read signal V2 are obtained or not. When both signals are obtained, it is judged that the offset of the data head lies within a range of the measurable specified value $\pm W_0/2$. Step S5 follows and a coefficient K indicative of a gradient of the straight line is multiplied to the signal difference (V1–V2), thereby obtaining the offset amount W. In step S6, if the offset has been obtained by the previous measuring process with respect to the same servo pattern, an adding process to add the newly obtained offset is performed. In step S7, the end flag FLi indicative of the completion of the measurement of the servo pattern which has just been processed at present is turned on. The offset amount after completion of the measurement is stored into the offset table 118 of the RAM 48 for driving.

When the offset of the data head exceeds the specified value $\pm W_0/2$ and either one of the offset read signal V1 or V2 is obtained, a check is first made in step S10 to see if only the read signal V1 has been obtained or not. When only the read signal V1 is obtained, step S11 follows and an offset Wi is derived by a prediction calculation, thereby correcting the head position. In step S17, if the offset was obtained by the previous measuring process, an adding process of the newly obtained offset is executed. When only the outer offset read signal V2 is derived, the presence of the signal V2 is discriminated in step S12. Step S13 follows. The offset is obtained by the prediction on the basis of the outer offset read signal V2, thereby correcting the head position. When the previous measurement result exists in step S17, the adding process is executed.

Further, when both of the read signal V1 and the outer offset read signal V2 are not obtained, step S14 follows and the presence or absence of the polarity signal V3 is discriminated. When the polarity signal V3 is obtained, this means that the data head is largely offset on the inner side from a recording state of the polarity pattern 150 in FIG. 7A. Therefore, step S15 follows and an offset correction to return the head to the outer side by only the predetermined constant amount $W_{const}$ is executed. After completion of such an offset correction to return the head to the outer side by only the predetermined amount $W_{const}$, when the previous offset measurement is performed in step S17, the adding process is performed and the processing routine advances to the next process. In step S14, when the polarity signal V3 is not obtained also, the data head is largely offset to the outer side. Therefore, step S16 follows and the head is offset to the inner side by only the predetermined constant amount $W_{const}$. After that, the offset adding process in step S17 is performed and the offset measuring process is again performed. In step S8, a check is made to see if the count value of the counter (N) indicative of the order of the measuring processes of the 16 servo patterns on the track has reached the final position or not. Until it reaches the final position, while increasing the value of the counter (N) one by one in step S9, the processes in steps S2 to S17 are repeated. When the last sixteenth servo pattern on the track is measured and the count value reaches (N=15) in step S8, the processing routine advances to step S18 and a check is made to see if the measuring processes at all points, namely, the measuring processes about the sixteen servo patterns have been finished or not by judging whether all of the end flags FLi are on or not. When the processes for all points are not yet finished, the processing routine is returned to step S1 and the count value (N) is set to 0. The processes in steps S2 to S8 are repeated. At the next second rotation after completion of the measuring processes about one rotation of the track, namely, 16 servo patterns, the end flag FLi is turned off and the offset measuring process of the point which is not yet measured is performed again. Namely, the measuring process is again executed in the following cases.

I. The case where only the previous inner offset read signal V1 is obtained.

II. The case where only the previous outer offset read signal V2 is obtained.

III. The case where both of the previous inner offset read signal V1 and outer offset read signal V2 are not obtained.

Among them, in the remeasuring process in the case where either one of the inner offset read signal V1 or outer offset read signal V2 is obtained, the head is returned in the track center direction by only the offset Wi predicted from each signal V1 or V2 by the process in step S11 or S13. Therefore, two read signals V1 and V2 are certainly obtained in the next measuring process and the measuring process can be completed via the processes in steps S5 to S7. When both of the offset read signals V1 and V2 are not obtained, the head is offset by only the predetermined amount $W_{const}$ to the track center side by the process in step S15 or S16 in accordance with the presence or absence of the polarity signal V3, so that at least either one of the read signals V1 and V2 is obtained by the next measuring process. By executing the measuring process once more, the measurement of the offset amount can be completed. If both of the offset read signals V1 and V2 are obtained by returning the head position by the predetermined amount $W_{const}$, the measurement of the offset amount can be completed by the second measuring process.

Figure 12A:
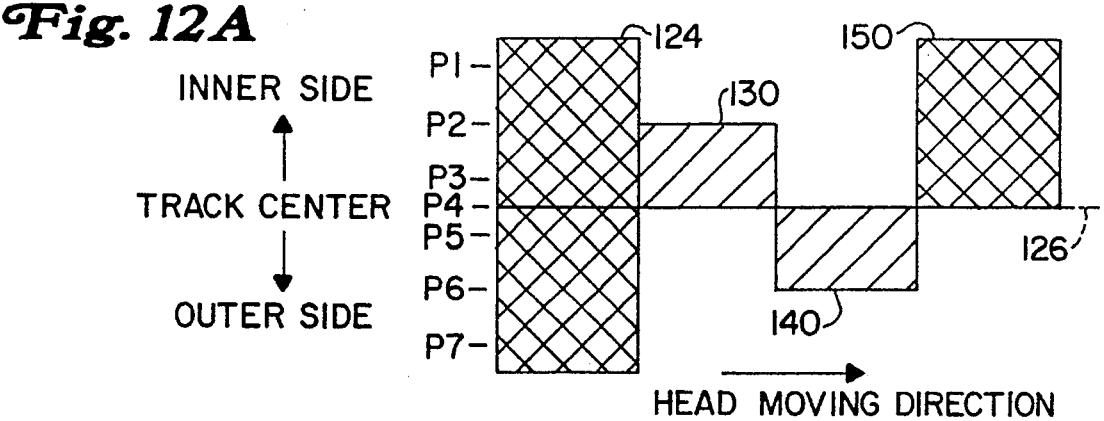
FIGS. 12A to 12H are explanatory diagrams of pattern read signals for set positions of heads according to the invention.
Figure 12B:
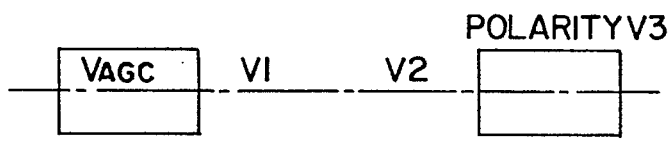
Figure 12C:
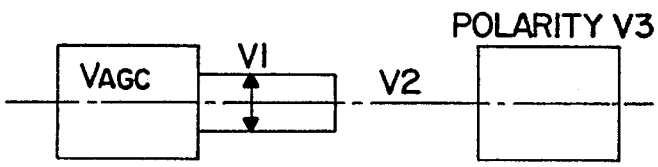
Figure 12D:
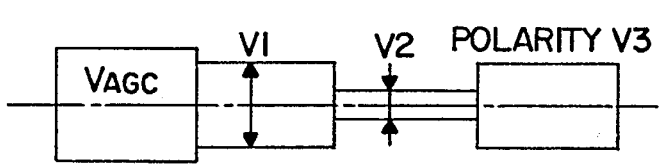
Figure 12E:
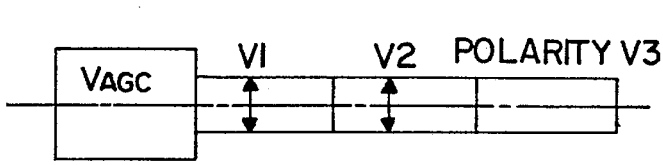
Figure 12F:
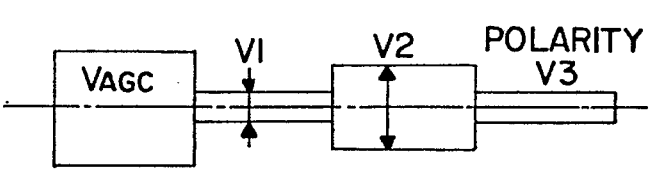
Figure 12G:
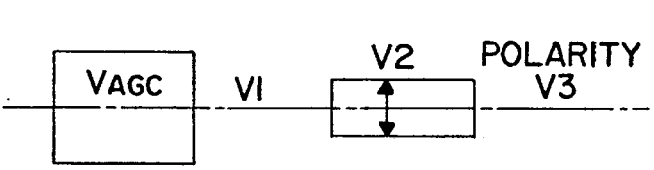
Figure 12H:
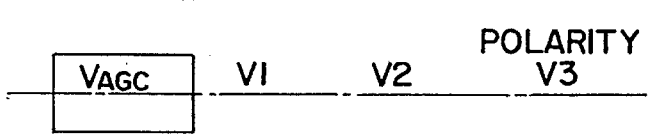

FIGS. 12A to 12H show the head positions for the patterns for offset detection on the specific cylinder of the servo surface and the amplitude levels of the AGC read signal $V_{AGC}$, inner offset read signal V1, outer offset read signal V2, and polarity signal V3 which are obtained at the respective head positions. FIG. 12A shows the center positions P1 to P7 of the head by the offset. The signal levels of the read signals of the AGC pattern 124, inner offset pattern 130, outer offset pattern 140, and polarity pattern 150 at the head center positions P1 to P7 are as shown in FIGS. 12B to 12H, respectively. For example, when the head is located at the position P1 which is largely deviated from the head center to the inner side by the first offset measurement, only the polarity signal V3 is obtained as shown in FIG. 12B. In this case, after the head was moved to the outer side by only the predetermined amount $W_{const}$, the offset is again measured. By the second measurement after performing the offset correction to return the head by the predetermined amount, for example, as shown in FIG. 12C or 12D, the signal amplitude level of only the read signal V1 or the signal amplitude levels of both of the read signals V1 and V2 are obtained. In case of only the read signal V1 in FIG. 12C, the processing routine can be completed by one more measuring process. In case of the read signals V1 and V2 in FIG. 12D, the offset amount is calculated from the level difference and the measurement can be finished. On the contrary, when the head is located at the position P7 which is largely deviated to the outer side from the head center, as shown in FIG. 12H, in addition to the read signals V1 and V2, the polarity signal V3 is also not obtained. In this case, after the head was moved to the inner side by only the predetermined amount $W_{const}$, the offset is again measured. Therefore, the read signals V1 and V2 as shown in FIG. 12G or 12F are obtained with respect to the second measurement. With respect to FIG. 12G, since only the read signal V2 is derived, the offset correction to return the head by only the predictive offset amount from the read signal V2 is executed. After that, by measuring the offset again, the measuring process is completed. With respect to FIG. 12F, since both of the read signals V1 and V2 are derived, the offset amount is calculated from the level difference and the measurement is finished. When the measuring process is executed two or more times, the offset amount which is obtained by adding the offset amount that was newly measured to the offset amount used for offset correction of the head up to the previous time is set to a measurement value each time the measuring process is executed.

FIGS. 13A to 13D show data surface servo patterns and pattern read signals which are used in the second embodiment of the invention. The data surface servo patterns in the second embodiment of FIG. 13A are patterns which are obtained by eliminating the polarity pattern from the servo patterns of FIG. 7A and are the same patterns as the conventional patterns of FIG. 1A. In the offset measurement of the invention, a check is made to see if the offset lies within the specified value or not from the offset read signals V1 and V2 of the inner offset pattern 130 and outer offset pattern 140. Fundamentally, when it is judged that the offset lies within the specified value, an offset amount Wn of the data head 18 is measured on the basis of the offset read signals V1 and V2, and when it is judged that the offset exceeds the specified value, while the data head 18 is returned by a predetermined amount in such a direction as to eliminate the offset, the remeasurement of the offset is repeated until it is judged that the offset lies within the specified value. Therefore, even in the servo pattern excluding the polarity pattern in FIG. 13A, when only either one of the read signals V1 and V2 is obtained and it is judged that the offset exceeds the specified value, the fundamental construction of the invention such that while the data head 18 is returned by the predetermined amount in such a direction as to eliminate the offset, the remeasurement of the offset is repeated until it is judged that the offset lies within the specified value can be applied as it is.

Figure 14A:
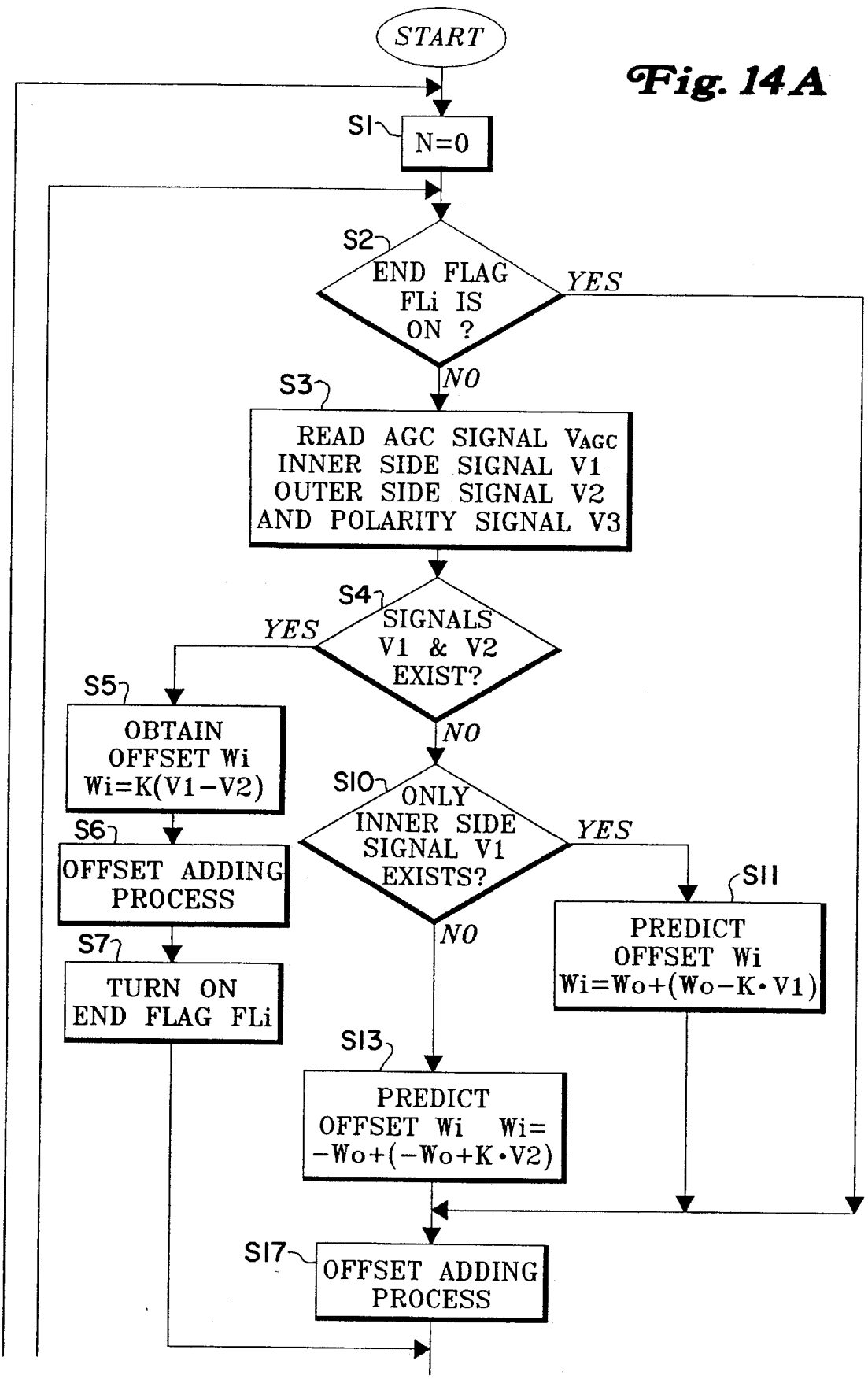
FIG. 14 is a sheet layout arrangement to facilitate the understanding of FIGS. 14A and 14B, FIGS. 14A and 14B are a flowchart for an offset measuring process according to the second embodiment of the invention.
Figure 14B:
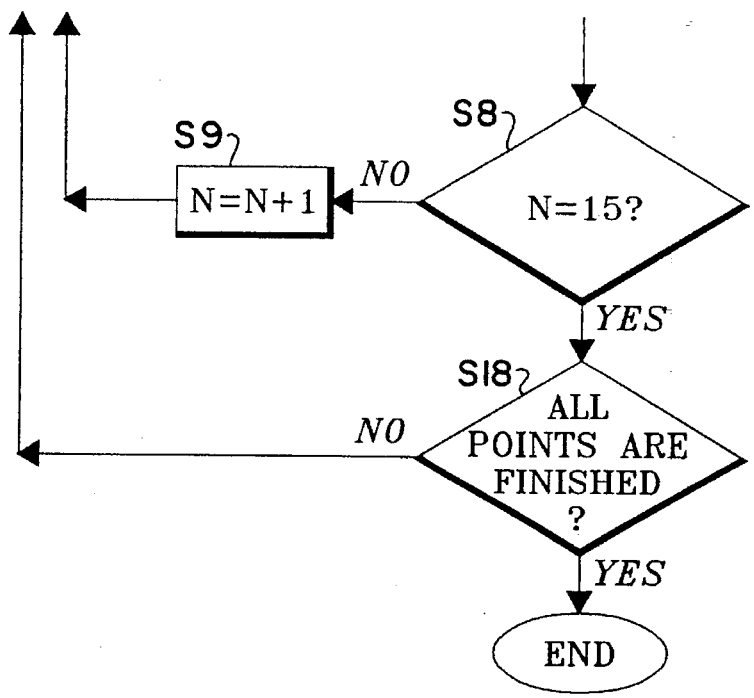
Figure 14:
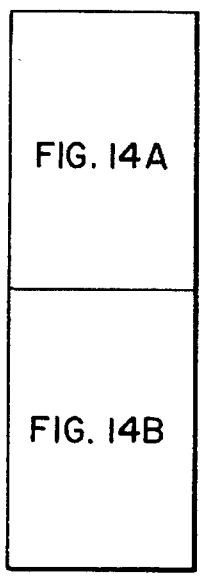

FIG. 14 is a sheet layout arrangement to facilitate the understanding of FIGS. 14A and 14B. The flowcharts of FIGS. 14A and 14B show an offset measuring process of the invention using servo patterns without the polarity pattern in FIG. 13A. The offset measuring process is a process obtained by eliminating the processes in steps S14, S15, and S16 regarding the polarity signal from the flowchart of the offset measuring process in FIG. 11. The process of only the outer offset read signal V2 in step S12 in FIG. 11 is also eliminated because it is determined from the result of the judgment in step S10. The second embodiment of FIGS. 13 and 14 is effective in the case where a size of offset which is predicted is a relatively small size such that is lies within $\pm 1.5W_0$ around the track center.

In the case where it is necessary to measure the offset in a wide range similar to FIG. 7A, as shown in FIG. 15A, it is also possible to further widen the inner offset pattern 130 and outer offset pattern 140 around the track center and to thereby obtain the AGC signal $V_{AGC}$ and read signals V1 and V2 in FIGS. 15B to 15D. In this case, when the offset exceeds $\pm W_0/2$, the read signals V1 and V2 in Figs. 15C and 15D reach the peak values and become constant. Therefore, it is sufficient that the return amount in the direction to eliminate the offset of the head in the case where the read signals are set to the constant peak values and the offset is again measured is set to a predetermined amount, for example, $1.5W_0$.

According to the invention, even in the case where the offset of the head occurs so as to exceed the effective offset measuring range in which both of the read signals of the inner offset pattern and outer offset pattern are obtained, the head is returned in the direction to eliminate the offset and the offset is again measured. Therefore, even if an offset of the head in a wide range occurs, the offset can be accurately measured. Even if the 2-phase servo system which needs the recording of the servo patterns to a plurality of cylinders is not used, the offset in a wide range can be measured by the recording of the servo patterns in a single cylinder. The recording area of the servo patterns which are provided on the data surface can be reduced. The recording capacity of the data surface can be increased by only the amount corresponding to such a reduced recording area. Further, by recording the polarity pattern to a width exceeding the inner or outer offset pattern, even if a large offset such that the read signal of the offset pattern is not obtained occurs, the direction of the offset is recognized in accordance with the presence or absence of the read signal of the polarity pattern, the head is returned in the offset eliminating direction, and the offset can be certainly measured again.

The invention is not limited by the numerical values shown in the embodiment. Although the return amount of the head when only the read signal V1 or V2 is obtained is determined by the prediction arithmetic operation from the levels of the read signals V1 and V2, the head can be also returned by only a predetermined constant amount.

What is claimed is:

1. A disk apparatus comprising:

a disk medium in which one of a plurality of disk surfaces is set to a servo surface on which servo information has been recorded every cylinder, the remaining disk surfaces are set to data surfaces, and as servo information for offset detection, first servo information is recorded so as to be offset to an inner side and second servo information is subsequently recorded so as to be offset to an outer side at specific cylinder positions of each of said data surfaces;

a head actuator which has a servo head to read the servo information of said servo surface and a plurality of data heads to read and write the information from/to said data surfaces and which can integrally move each head in such a direction as to traverse tracks;

a measurement positioning section for positioning each of said heads to the specific cylinder position for offset detection of each of said data surfaces when an offset is measured; and an offset measuring section for judging whether the offset lies within a specified range or not from read signals of said servo information recorded in said specific cylinder for offset detection, for measuring an offset amount (Wn) of each of said data heads on the basis of said read signals in the case where it is judged that said offset lies within the specified range, for moving said data head by a predetermined amount in such a direction as to eliminate the offset of said data head, in the case where it is judged that the offset exceeds said specified range for again measuring an offset, and for setting a total value of said predetermined amount and the offset amount which was again measured to an offset measurement value.

2. An apparatus according to claim 1, wherein in the case where both of the read signal (V1) of the first servo information recorded so as to be offset to said inner side and the read signal (V2) of said second servo information recorded so as to be offset to the outer side are obtained, said offset measuring section judges that the offset of said data head lies within said specified range, and the offset amount (value) is calculated on the basis of a difference between the amplitude levels of said two read signals (V1, V2).

3. An apparatus according to claim 1, wherein in the case where only the read signal (V1) of the first servo information recorded so as to be offset to the inner side is obtained, said offset measuring section judges that said data head is offset to the inner side so as to exceed said specified range the offset amount is predicted on the basis of said read signal (V1) and, after that, said data head is moved to the outer side by only said predicted offset amount (Wn), and the offset amount is again measured.

4. An apparatus according to claim 1, wherein in the case where only the read signal (V2) of said second servo information recorded so as to be offset to the outer side is obtained, said offset measuring section judges that said data head is offset to the outer side so as to exceed said specified range, the offset amount is predicted on the basis of said read signal (V2) and, after that, said data head is moved to the inner side by only said predicted offset amount, and the offset amount is again measured.

5. An apparatus according to claim 1, wherein said offset measuring section repeats a plurality of times the remeasurement of the offset which is executed by moving said data head by said predetermined amount in such a direction as to eliminate the offset until it is judged that the offset lies within said specified range, a total value of said predetermined amount corresponding to said plurality of times and the offset amount which was finally measured is set to an offset measurement value.

6. An apparatus according to claim 1, wherein in said disk medium, said respective servo information for offset detection is grouped as one set and such sets are recorded at a plurality of positions on the track of the specific cylinder of the data surface.

7. An apparatus according to claim 6, wherein said offset measuring section has a memory table to store the offset amounts detected from said plurality of positions on said specific cylinder, the head is moved in such a direction as to eliminate the offset amount which was read out from said memory table synchronously with the disk rotation, and the offset is subsequently measured again.

8. An apparatus according to claim 1, wherein polarity servo information of a size exceeding recording widths of said first and second servo information is recorded at the specific cylinder position of each data surface of said disk medium subsequent to said first and second servo information for offset detection, in the case where both of the read signals (V1, V2) of said first and second servo information are not obtained by said data head, said offset measuring section judges the presence or absence of a read signal (V3) of said polarity servo information, in the case where said polarity servo information read signal (V3) is obtained, said data head is moved to the side opposite to the recording side of said polarity servo information by only a predetermined constant offset amount and the offset amount is again measured, and in the case where said polarity servo information read signal (V3) is not obtained, said data head is moved to the recording side of said polarity servo information by only a predetermined constant offset amount, and the offset amount is subsequently measured again.

9. An apparatus according to claim 8, wherein said offset measuring section repeats a plurality of times the remeasurement of the offset which is executed by moving said data head by a predetermined amount in such a direction as to eliminate the offset until it is judged that the offset lies within said specified range, and the total value of said predetermined amount corresponding to said plurality of times and the offset amount which was finally measured is set to an offset measurement value.

10. An apparatus according to claim 8, wherein in the disk medium, said respective servo information for offset detection are grouped to one set and said sets are recorded at a plurality of positions on the track of the specific cylinder of the data surface.

11. An apparatus according to claim 10, wherein said offset measuring section has a memory table to store the offset amounts detected from said plurality of positions on said specific cylinder, the head is moved in such a direction as to eliminate the offset amount read out from said memory table synchronously with the data rotation, and the offset is subsequently measured again.

12. An apparatus according to claim 1, wherein while switching each of said data heads, said offset measuring section measures the offset amount of every said data head.

13. An apparatus according to claim 1, wherein said offset measuring section measures the offset amount at the time of turn-on of a power source of the apparatus and stores said offset amount into a memory table.

14. An apparatus according to claim 1, wherein after a power source was turned on, said offset measuring section measures the offset amount every predetermined elapsed time.

15. An apparatus according to claim 1, wherein in said disk medium, Automatic Gain Control amplitude information to set a reference amplitude level which is set into an AGC amplifying section to amplify the read signal from said data head is recorded at the head of said servo information for offset detection, and said apparatus further comprises:
a reference amplitude level measuring section for measuring an amplitude reference level of said AGC amplifying section of every said data head on the basis of a read signal ($V_{AGC}$) of said AGC amplitude information obtained from the specific cylinder of each of said data surfaces; and
a level setting section for setting the amplitude reference level measured by said reference amplitude level measuring section into said AGC amplifying section synchronously with the disk rotation.

16. A disk medium wherein one of a plurality of disk surfaces is set to a servo surface on which servo information has been recorded every cylinder, the remaining disk surfaces are set to data surfaces, and further as servo information for offset detection, first servo information which is offset to an inner side, second servo information which is offset to an outer side, and polarity information which is offset to the inner side or outer side and has a size exceeding a recording width of said first or second servo information are recorded at the specific cylinder positions of each of said data surfaces so as to be arranged in a track direction.

17. A medium according to claim 16, wherein AGC amplitude information to measure a reference amplitude level which is set into an AGC amplifier to amplify the read signal from the data head is recorded at the head of said servo information for offset detection.

* * * * *

UNITED STATES PATENT AND TRADEMARK OFFICE
CERTIFICATE OF CORRECTION

PATENT NO.   : 5,592,347
DATED        : January 7, 1997
INVENTOR(S)  : Mori et al.

It is certified that error appears in the above-indentified patent and that said Letters Patent is hereby corrected as shown below:

Column 6, line 39, delete "to 28-3 every two heads" and insert --to 28-6--.

Column 6, line 40, delete "to 28-3 are" and insert --to 28-6 are--.

Column 7, line 11, delete "an enough large width then" and insert --a width larger than--.

Signed and Sealed this

Twenty-first Day of October 1997

*Attest:*

BRUCE LEHMAN

*Attesting Officer*            *Commissioner of Patents and Trademarks*